(12) United States Patent
Ye et al.

(10) Patent No.: US 7,028,074 B2
(45) Date of Patent: Apr. 11, 2006

(54) AUTOMATICALLY DETERMINING THE AWARENESS SETTINGS AMONG PEOPLE IN DISTRIBUTED WORKING ENVIRONMENT

(75) Inventors: Yiming Ye, White Plains, NY (US); Stephen J. Boies, Mahopac, NY (US); Paul Y. Huang, Katonah, NY (US); John K. Tsotsos, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 09/897,142

(22) Filed: Jul. 3, 2001

(65) Prior Publication Data

US 2003/0028593 A1    Feb. 6, 2003

(51) Int. Cl.
*G06F 15/16* (2006.01)
*G06F 15/173* (2006.01)

(52) U.S. Cl. ...................... 709/204; 709/223
(58) Field of Classification Search ................ 709/204, 709/223, 224; 715/716, 753, 756; 370/260; 348/14.1
See application file for complete search history.

(56) References Cited

U.S. PATENT DOCUMENTS

| | | | |
|---|---|---|---|
| 4,974,173 A | | 11/1990 | Stefik et al. |
| 5,008,853 A | | 4/1991 | Bly et al. |
| 5,793,365 A | | 8/1998 | Tang et al. |
| 5,819,243 A | | 10/1998 | Rich et al. |
| 5,872,924 A | | 2/1999 | Nakayama et al. |
| 5,983,192 A | * | 11/1999 | Botzko et al. ............. 704/500 |
| 5,996,002 A | | 11/1999 | Katsurabayashi et al. |
| 6,148,328 A | * | 11/2000 | Cuomo et al. ............. 709/204 |
| 6,288,739 B1 | * | 9/2001 | Hales et al. ............ 348/14.07 |
| 6,453,336 B1 | * | 9/2002 | Beyda et al. ............... 709/204 |
| 6,628,767 B1 | * | 9/2003 | Wellner et al. ........ 379/202.01 |
| 6,662,211 B1 | * | 12/2003 | Weller ........................ 709/204 |
| 6,665,707 B1 | * | 12/2003 | Bates et al. ................. 709/204 |
| 6,697,341 B1 | * | 2/2004 | Roy ............................ 370/260 |
| 6,697,840 B1 | * | 2/2004 | Godefroid et al. .......... 709/205 |
| 6,807,563 B1 | * | 10/2004 | Christofferson et al. .... 709/204 |
| 2003/0007001 A1 | * | 1/2003 | Zimmerman ............... 345/716 |

OTHER PUBLICATIONS

Judith Donath, "Wisual Who: Animating the affinities and activities of an electronic community", 1995, ACM Multimedia 95 Electronic Proceedings, Available at: http://smg.media.mit.edu/people/Judith/VisualWho/VisualWho.html.*

(Continued)

*Primary Examiner*—Dung C. Dinh
*Assistant Examiner*—Aaron Strange
(74) *Attorney, Agent, or Firm*—Whitham, Curtis & Christofferson, P.C.; Stephen C. Kaufman

(57) ABSTRACT

Communication channels among users in a collaborative computing system are automatically adjusted based on users' current states detected by various sensing devices. The collaboration system that includes an awareness system for evaluating, monitoring, and controlling, in real-time, the collaboration environment by having events and occurrences with properties. The awareness monitoring system includes (1) receiving and analyzing real time data from input sensors and (2) an elastic spring energy model for automatically adjusting a distance according to a level of privacy desired by individual users, the requirement of the organization, and a need of the collaborative project to have some shared information about individual user activities. When a spring energy model is difficult to obtain, a matrix looks up model is used to automatically adjust a distance according to a level of privacy desired by individual users, the requirement of the organization, and the need of the collaborative project.

11 Claims, 26 Drawing Sheets

OTHER PUBLICATIONS

Fumio Hattori, Takeshi Ohguro, Makoto Yokoo, Shiegeo Matsubara, and Sen Yoshida, "Socialware: Multiagent Systems for Supporting Network Communities", 1999.*

Marilyn M. Mantei, Ronald M. Baecker, Abigail J. Sellen, William Buxton, and Thomas Milligan, "Experiences in the Use of a Media Space", 1991, Proceedings of ACM SIGCHI CHi'91, pp 203-208.*

Renee Gedge and David Abramson, "The Virtual Tea Room—Experiences with a New Type of Social Space", 2001, 7th International Workshop on Groupware, Sep. 6-8, 2001, pp 98-102.*

Yiming Ye, Stephen Boies, Paul Huang, and John K. Tsotsos, "Smart Distance and WWWaware—a multi-agent approach", May 2001, Proc. of 5th International Conference on Autonomous Agents, pp 176-177.*

A. Lee, A. Girgensohn, and J. Zhang,"Browsers to Support Awareness and Social Interaction", 2004, In IEEE Computer Graphics and Applications, Los Alamitos CA:IEEE Computer Society, 24(5), pp. 66-75.*

Yiming Ye, Stephen Boies, "Event Perception in Agent Mediated Computer Supported Cooperative Work", Nov. 30, 2004, IBM Research Report RC21894□□.*

* cited by examiner

AUTOMATICALLY DETERMINING THE AWARENESS SETTINGS AMONG PEOPLE IN DISTRIBUTED WORKING ENVIRONMENT

BACKGROUND OF THE INVENTION

1. Field of the Invention

The present invention generally relates to collaborative computing and, more particularly, to a way to automatically determine the awareness settings among people in a distributed working environment.

2. Background Description

Collaborative computing is a shared computing environment or application that facilitates communication and teamwork among groups of people.

Displaying common data on multiple computers is one type of collaborative work support system. U.S. Pat. No. 5,996,002 to Katsurabayashi et al. for "Collaborative Work Support System and Method to Facilitate the Process of Discussion in a Meeting Using a Shared Window" discloses a system that includes shared data that is displayed on each computer, individual data that is individually displayed on any of the computer selected by the data owner, and a manager for managing data storage. A similar system that displays shared data on multiple computers is disclosed in U.S. Pat. No. 5,872,924 to Nakayama et al. for "Collaborative Work Support System" in which a limited amount of data is displayed according to multiple attributes setting in the shared windows.

A detail log is a simple way to provide user activity information. U.S. Pat. No. 5,008,853 to Bly et al. for "Representation of Collaborative Multi-user Activities Relative to Shared Structured Data Objects in a Networked Workstation. Environment" proposed a multi-user collaborative system in which the contents as well as the current status of other user activity can be concurrently accessed by different users. The WYSIWIS (What You See Is What I See) user interface representation includes an ordered listing of such entries that are maintained by the structured data object and various attributes of each listed entry; inter alia, the type and class of entry, the revision number of the shared structured data object, the number of pages and revision number of each structured data object entry, the date of creation and last revision of each such entry, whether an entry can be accessed by a user and, if not, who has prevented such access to prevent concurrent editing, whether a local instance of an entry is present on a user's system, and a provision for miscellaneous notes or comments relative to each entry for view by other users.

Visual representation of other users is a standard way of monitoring other's activity. U.S. Pat. No. 5,793,365 to Tang et al. for "System and Method Providing a Computer User Interface Enabling Access to Distributed Workgroup Members" discloses a system that uses a user interface to display visual representations of selected other users in the workgroup. The visual representations are frequently updated to indicate the activity level of these users. An encounter awareness system detects the presence of other users who are doing similar tasks. U.S. Pat. No. 4,974,173 to Stefik et al. for "Small-scale Workspace Representations Indicating Activities by Other Users" proposes a computer system and method that provide networked computer users with information about which other users are task proximate to the user, thereby facilitating spontaneous communications regarding task-related, or other issues. Task proximity to other users may change as the user context switches between applications, and the user interface window is updated accordingly. Task proximity is determined individually by different applications.

Discourse manager has been used to promote effective collaboration between a user and a collaborative computer agent. U.S. Pat. No. 5,819,243 to Rich et al. for "System with Collaborative Interface Agent" suggested a system which operates according to a theory of collaborative discourse between humans, with the computer agent playing the same role as a human collaborator. The discourse manager includes a memory in which application-specific recipes are stored and a memory in which the discourse state is stored. Each recipe specifies a set of actions or sub-tasks, which are performed to achieve an objective. The discourse state includes structures to track the agent's and user's current objectives, a selected recipe for each objective, and completed steps in each recipe. During operation of the discourse manager, user actions and communications are interpreted according to how they relate to the current discourse state. The manager also generates an agenda of expected communications, which is presented to the user as a menu, obviating the need for the natural language understanding by the agent.

Prior work in collaborative computing can provide awareness among group members through various communication channels, such as video, audio, graphical user interface (GUI), etc. However, the prior work requires users to adjust the communication channel and the degree of communications. For example, when a person leaves his or her office, he or she has to manually turn the audio and video off if it is not needed. This is not convenient.

SUMMARY OF THE INVENTION

It is therefore an object of the present invention to provide a way to automatically adjust communication channels among users based on users' current states detected by various sensing devices.

According to the invention, there is provided a collaboration system that includes an awareness system for evaluating, monitoring, and controlling, in real-time, the collaboration environment by having events and occurrences with properties. The awareness monitoring system includes (1) input sensors for receiving real-time data produced by the event and (2) an elastic spring energy model for automatically adjusting a distance that is according to a level of privacy desired by individual users and a need of the collaborative project to have some shared information about individual user activities.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
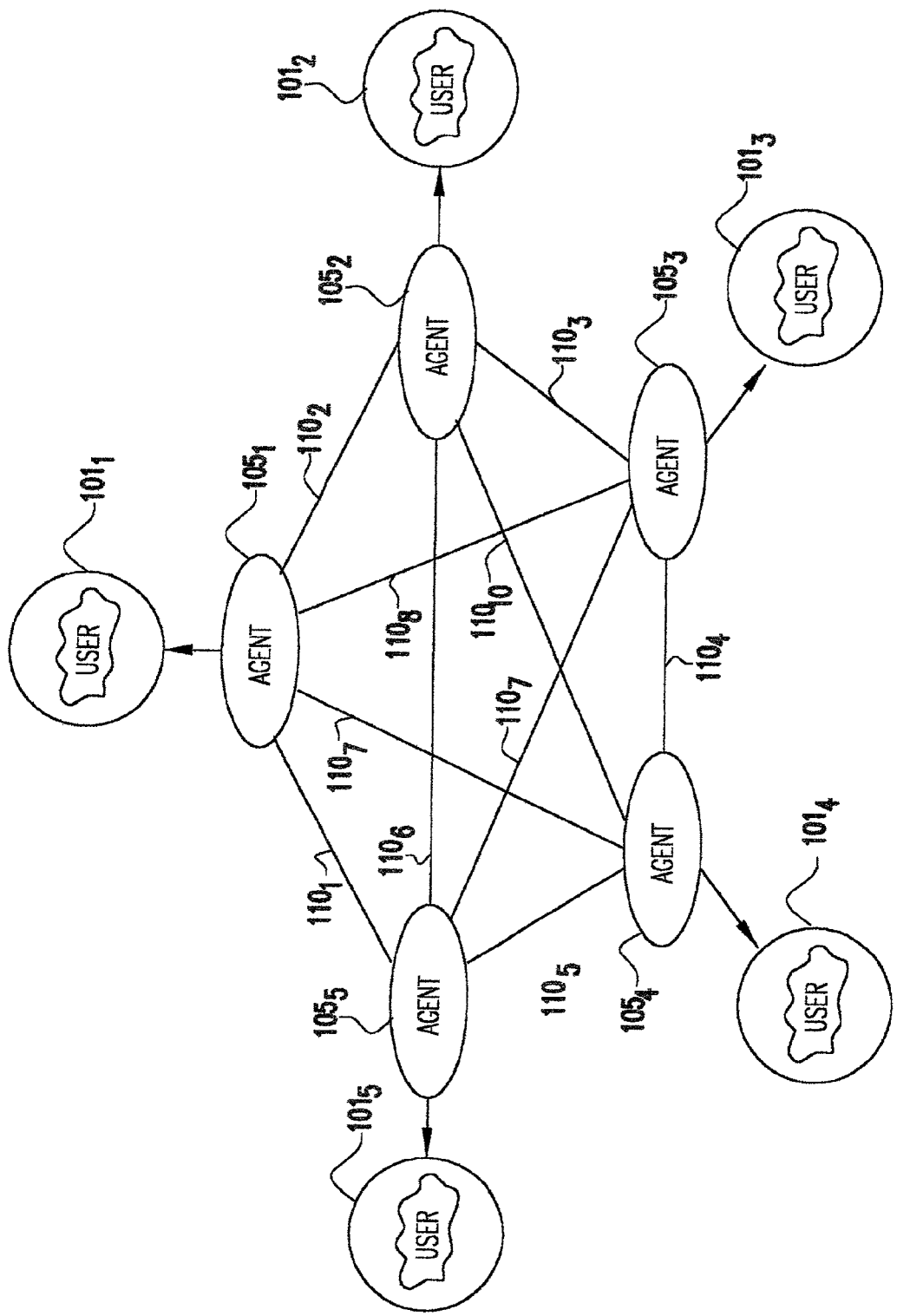
FIG. 1 is a block diagram of one preferred embodiment of the system.

Referring now to the drawings, and more particularly to FIG. 1, there is shown one preferred embodiment of the system. Blocks $101_1$ to $101_5$ represent the environments of single users. Blocks $105_1$ to $105_5$ represent agents for respective users. Lines $110_1$ to $110_{10}$ represent the communication channels between two agents.

Figure 2:
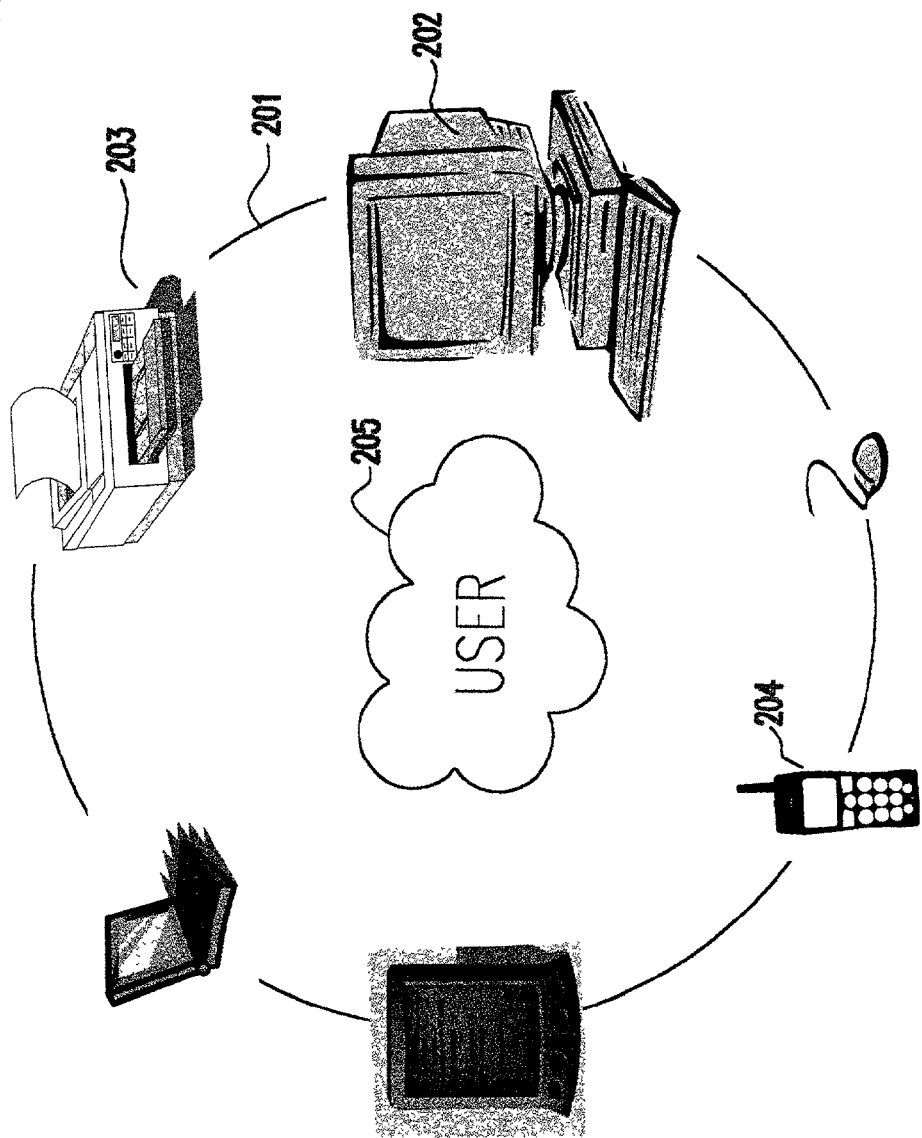
FIG. 2 is a block diagram showing a user environment.

FIG. 2 shows in more detail a user environment. 201 refers to those devices surrounding a user. These might include, for example, a personal computer 202, a printer 203, and a cell phone 204, among other devices. At the center of the diagram, 205 refers to the user. Through communications with agents of other users, information pertaining to a current user can be delivered to other users, and vise versa.

Figure 3:
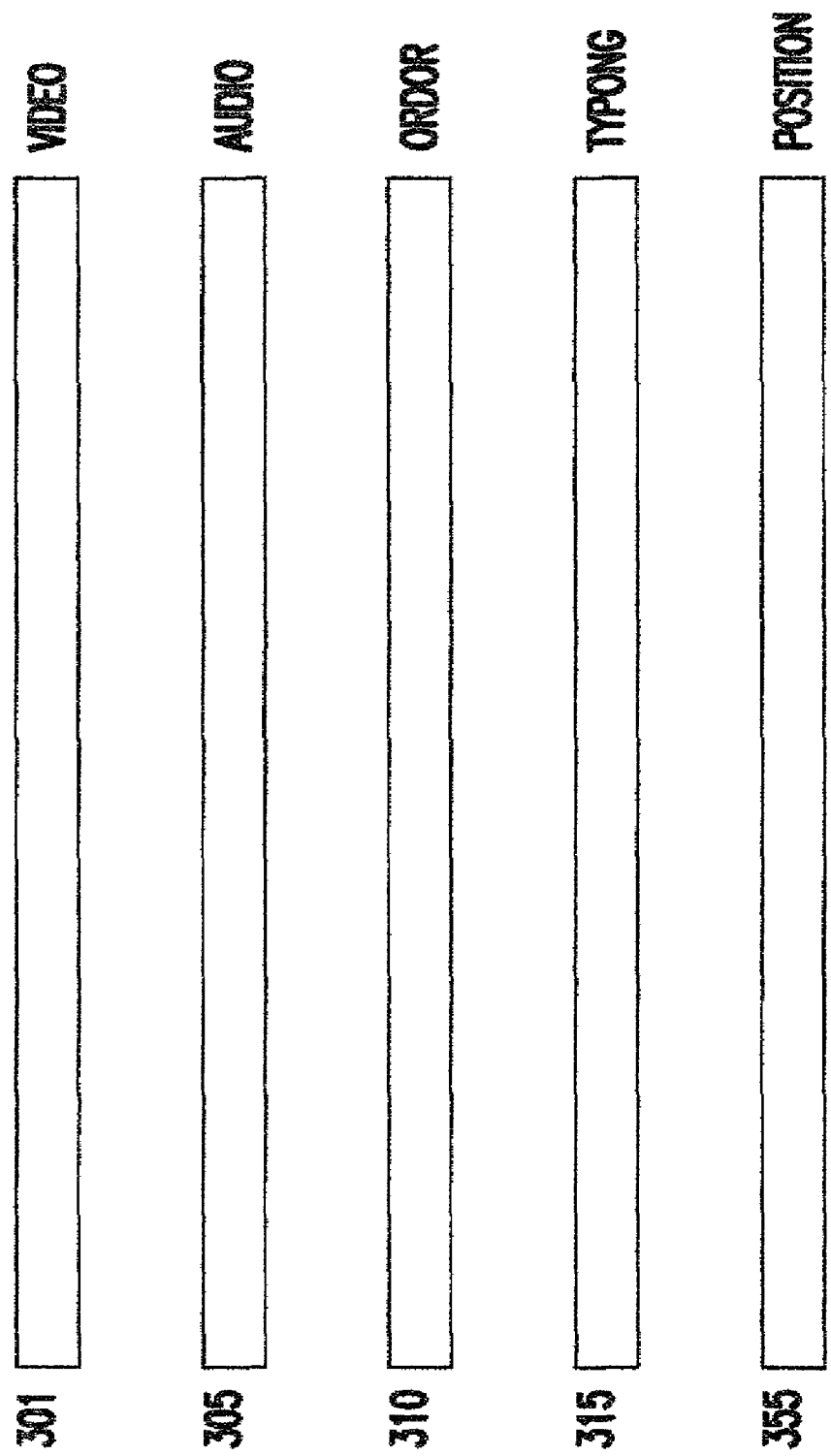
FIG. 3 is a diagram showing different channels for communication between agents.

FIG. 3 is a diagram showing different channels for communication between agents. 301 represents a video channel that can transmit video signals from/to users. 305 is the audio channel. 315 is the channel for orders. 315 is the channel that transmit the typing activities of users. 355 represents the channel for users' positions. These positions can be detected by many devices, such as a Global Position System, etc.

Figure 4:
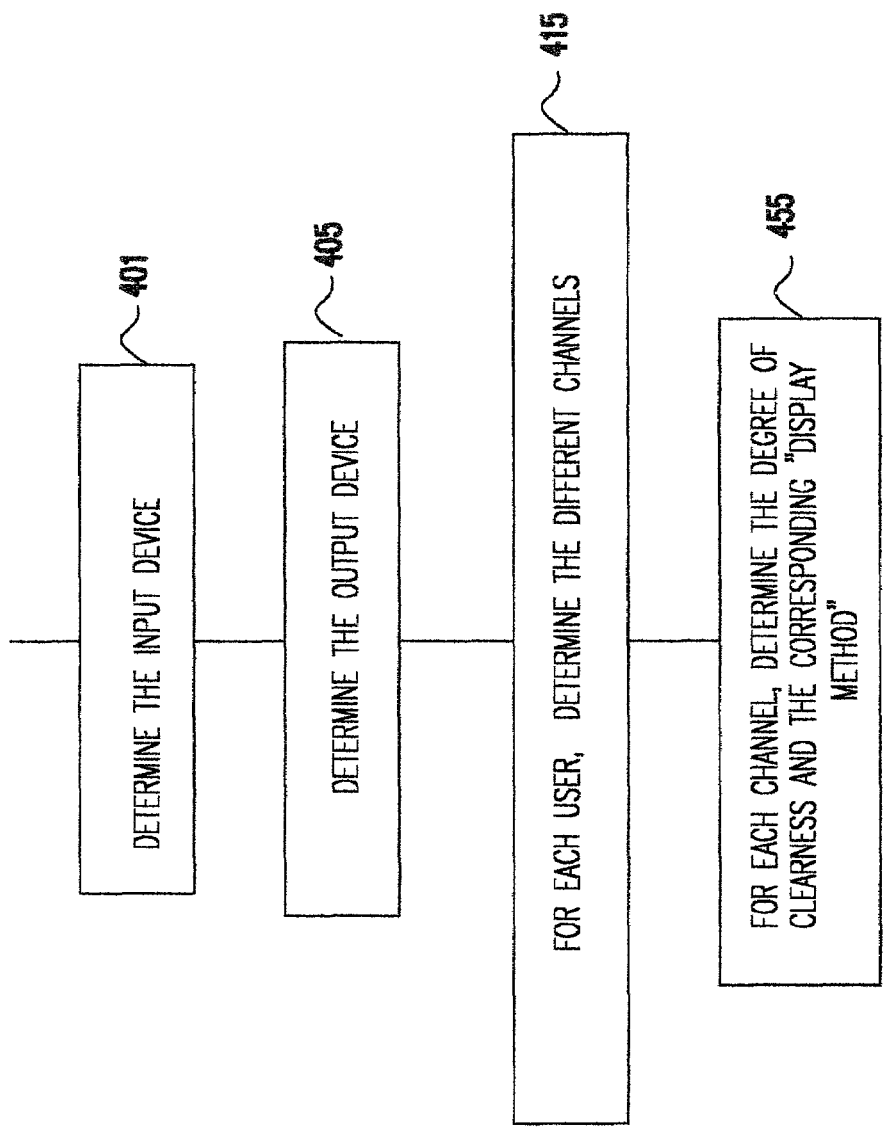
FIG. 4 is a flow diagram showing the process of the system setup procedure.

FIG. 4 is a flow diagram showing the system setup procedure. In function block 401, the input device is determined. Input devices are those devices that can sense the user. For example, a keyboard is an input device, a camera is an input device, a seismometer is an input device, a microphone is an input device. There are many examples of input devices. Function block 405 determines the output devices. For example, a screen is an output device, a speaker is an output device, etc. Some devices are both input and output devices, for example, a touch screen is both an input and output device. In function block 415, all the possible channels for each user are determined. Suppose that there are a total of m different channels. A channel refers to an independent way of representing an user's activities to the other users. For example, a video channel is a channel for presenting an user's activities. An input device such as a camera can an grab the images and an output device such as a computer screen can output the activities. The video channel can be one channel for the system. Another channel example is the audio channel. A microphone can grab voice signals and a speaker can send the signal to relevant user. Function block 455 determines the distances for each channel. The distance refers to how clear the receiver can receive the corresponding signal of the other party. For example, in a video channel, the receiver may get a very clear video image or it may get a fuzzy image or it may only get the image after processing or the transmitting rate might be too high or low, etc. The task of this block is to identify the different degrees of clearness of the video image transmitted and then assign to these different degrees a distance number. The higher the distance number, the lower the quality of the signals transmitted through this channel. In a practical system, we can simply assign all the possible different choices to a number between 1 and 100. Where when the distance equals 1, the video signal will be the best one that can be possibly transmitted. When the distance equals 100, the quality of the signal will be the worst one that can be transmitted.

Figure 5:
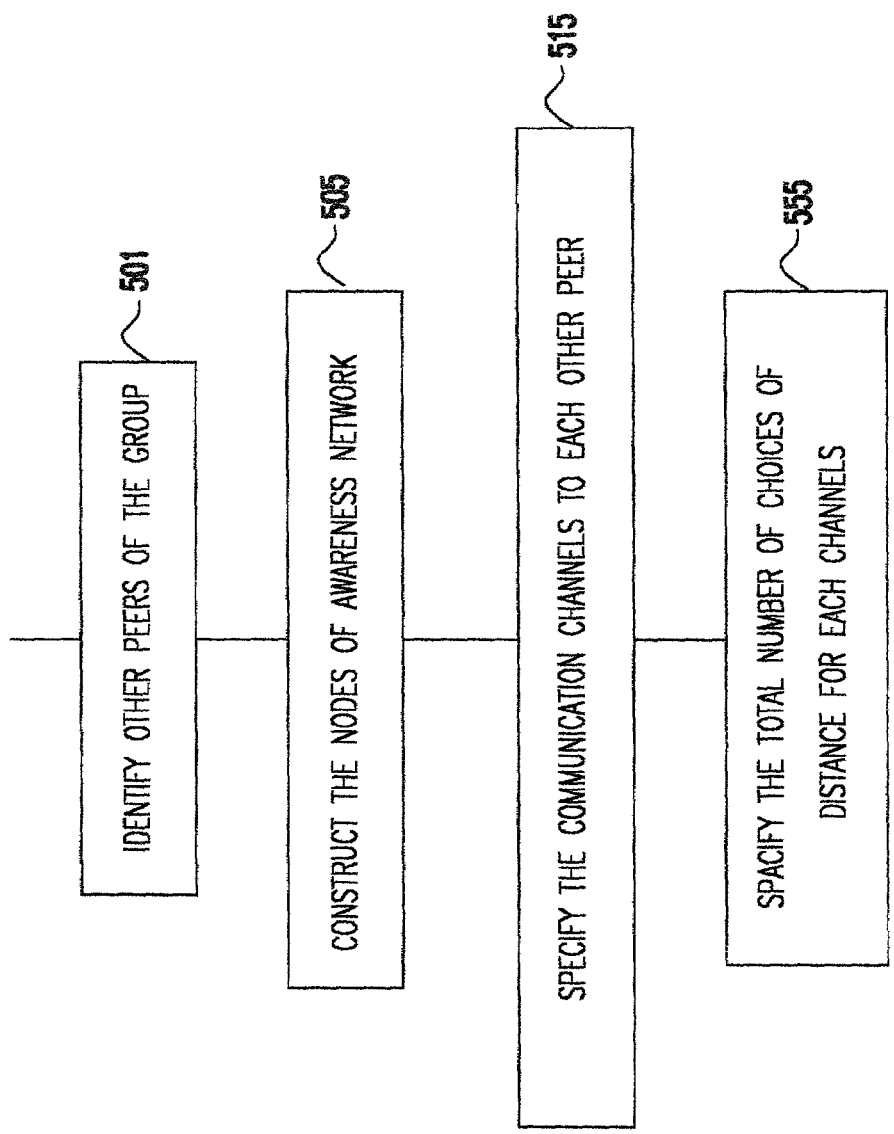
FIG. 5 is a flow diagram showing the process of the awareness network build up process.

FIG. 5 is a flow diagram showing the awareness network build up process. In function block 501, all the peers within the group are identified. This will define the range of the system. For purposes of illustration, assume n is the total number of peers in the system. Function block 505 represents each peer by a node. Thus, we have a total of n nodes available in the awareness network. In function block 515, the communication channels among the peers is specified. For each pair of peers i and j, we have m direct links from node i to node j, and m direct links from node to node i. Each link represents a communication channel. A link from node i to node j refers to the corresponding communication channel that used to deliver the signals for user i to be presented to user j. In function block 555, for each link, the total number of choices/distances that can be used is specified. This number comes from function block 455 in FIG. 4.

Figure 6:
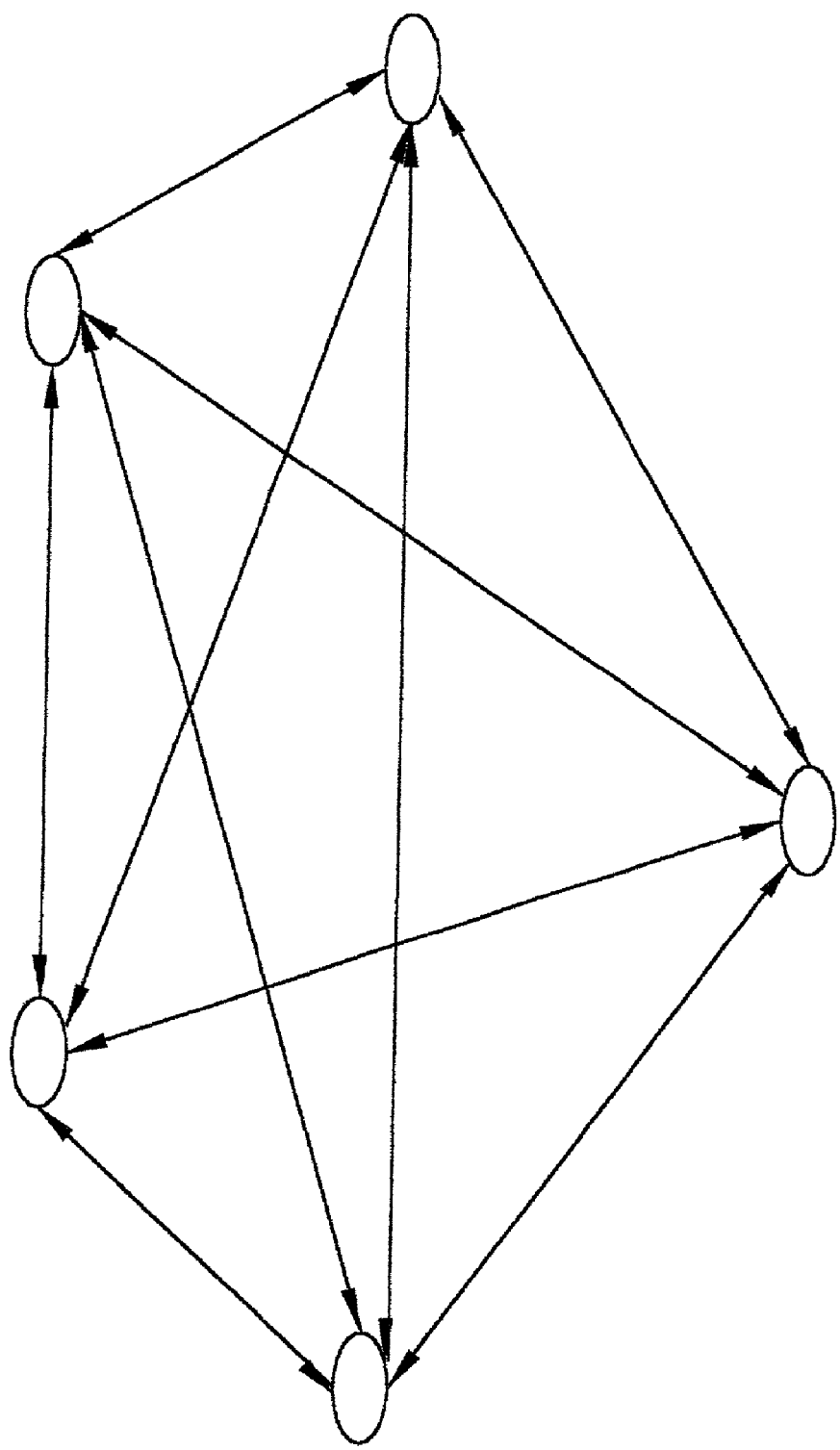
FIG. 6 is a network diagram graphically illustrating the awareness network.

FIG. 6 is a diagram shows a graphical description of the awareness network based on the embodiment of FIG. 1. There are five nodes in the awareness network, and there are only one channel for each peer of nodes. The status of a awareness network can be represented by an awareness matrix A:

$$A(k) = \begin{bmatrix} a_{11}(k) & \cdots & a_{1n}(k) \\ \vdots & \ddots & \vdots \\ a_{nl}(k) & \cdots & a_{mn}(k) \end{bmatrix},$$

where $a_{ij}(k)$ gives the value of the distance from user i to user j with respect to channel k for the awareness network. Here k can be any value from 1 . . . m. When i=j, the value of $a_{ii}$=0.

In addition to the matrix representing the current state of the awareness network, we also use another matrix to represent ideal distances with respect to different channels and different parties. The ideal distance that an agent want to provide to other agents is represented by matrix S:

$$S(k,e) = \begin{bmatrix} s_{11}(k,e) & \cdots & s_{1n}(k,e) \\ \vdots & \ddots & \vdots \\ s_{nl}(k,e) & \cdots & s_{mn}(k,e) \end{bmatrix},$$

where $s_{ij}(k,e)$ gives the value of the ideal distance that user i wants to provide to user j with respect to channel k for a given event e. Here k can be any value from 1 . . . m. When i=j, the value of $s_{ii}$=0. This is the only place that events e matters.

The ideal distance that the organization want is represented by matrix G:

$$G(k) = \begin{bmatrix} g_{11}(k) & \cdots & g_{1n}(k) \\ \vdots & \ddots & \vdots \\ g_{nl}(k) & \cdots & g_{mn}(k) \end{bmatrix},$$

where $g_{ij}(k)$ gives the value of the ideal distance that the organization wants user i to provide to user j with respect to channel k. Here k can be any value from 1 . . . m. When i=j, the value of $g_{ii}$=0. Basically, the organization of the team may have some special requirement, these requirements will be one of the factors that might influence the final decisions of an agent.

The ideal distance that the other agents want is represented by matrix O:

$$O(k) = \begin{bmatrix} o_{11}(k) & \cdots & o_{1n}(k) \\ \vdots & \ddots & \vdots \\ o_{nl}(k) & \cdots & o_{mn}(k) \end{bmatrix},$$

where $o_{ij}(k)$ gives the value of the ideal distance that the user j wants user i to provide to him with respect to channel k. Here k can be any value from 1 . . . m. When i=j, the value of $o_{ij}$=0. Basically, this is the other agent's requirement. For a given agent, it must consider all the other agents' requirements.

The ideal distance required by the given task is represented by matrix T:

$$T(k) = \begin{bmatrix} t_{11}(k) & \cdots & t_{1n}(k) \\ \vdots & \ddots & \vdots \\ t_{nl}(k) & \cdots & t_{mn}(k) \end{bmatrix},$$

where $j_{ij}(k)$ gives the value of the ideal distance that the current task wants user i to provide to user j with respect to channel k for a given event e. Here k can be any value from 1 . . . m. When i=j, the value of $t_{ii}$=0. Basically, different tasks the team is involved in will have different requirements. For example, if the team is having a brain storming session, then the requirement for video is very high, while if all the members of the team is just working on their own stuff, then a video connection may not even be needed. The requirement of the task is independent of the events happening on each user's site.

Figure 7:
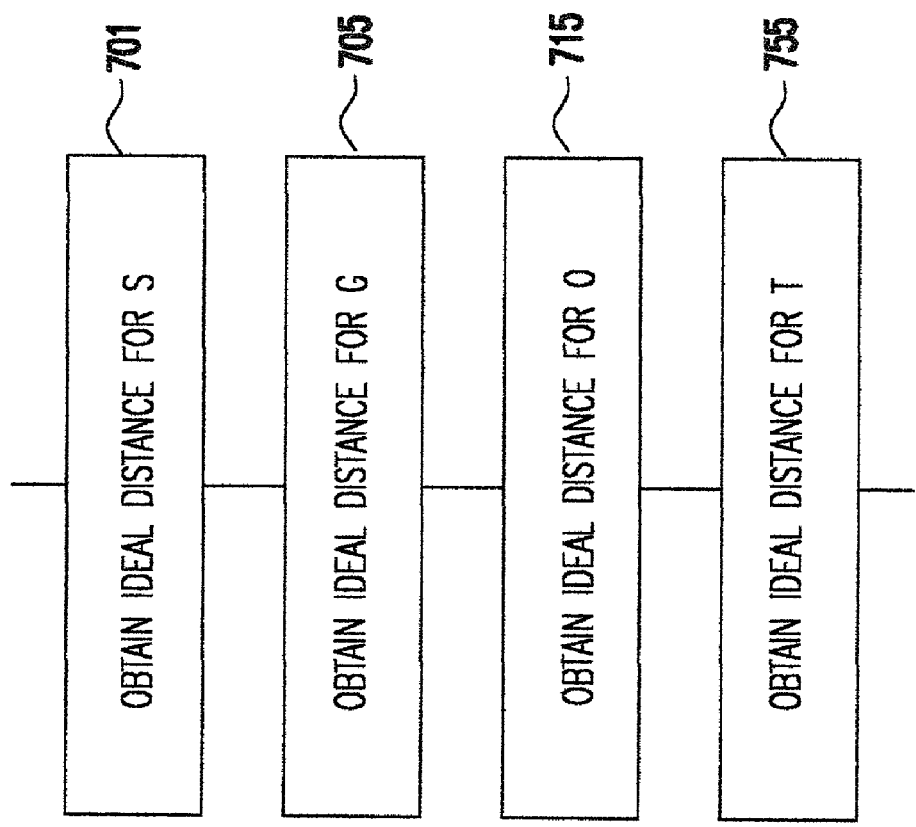
FIG. 7 is a flow diagram showing the process of obtaining the ideal distance for preparing on-line activities.

FIG. 7 is a flow diagram showing the process of obtaining the ideal distance for preparing on-line activities. In function block 701, the values for matrix S are obtained. Function block 705 obtains the values for matrix G. Function block 715 obtains the values for matrix O. Function block 755 obtains the values for matrix T.

Figure 8:
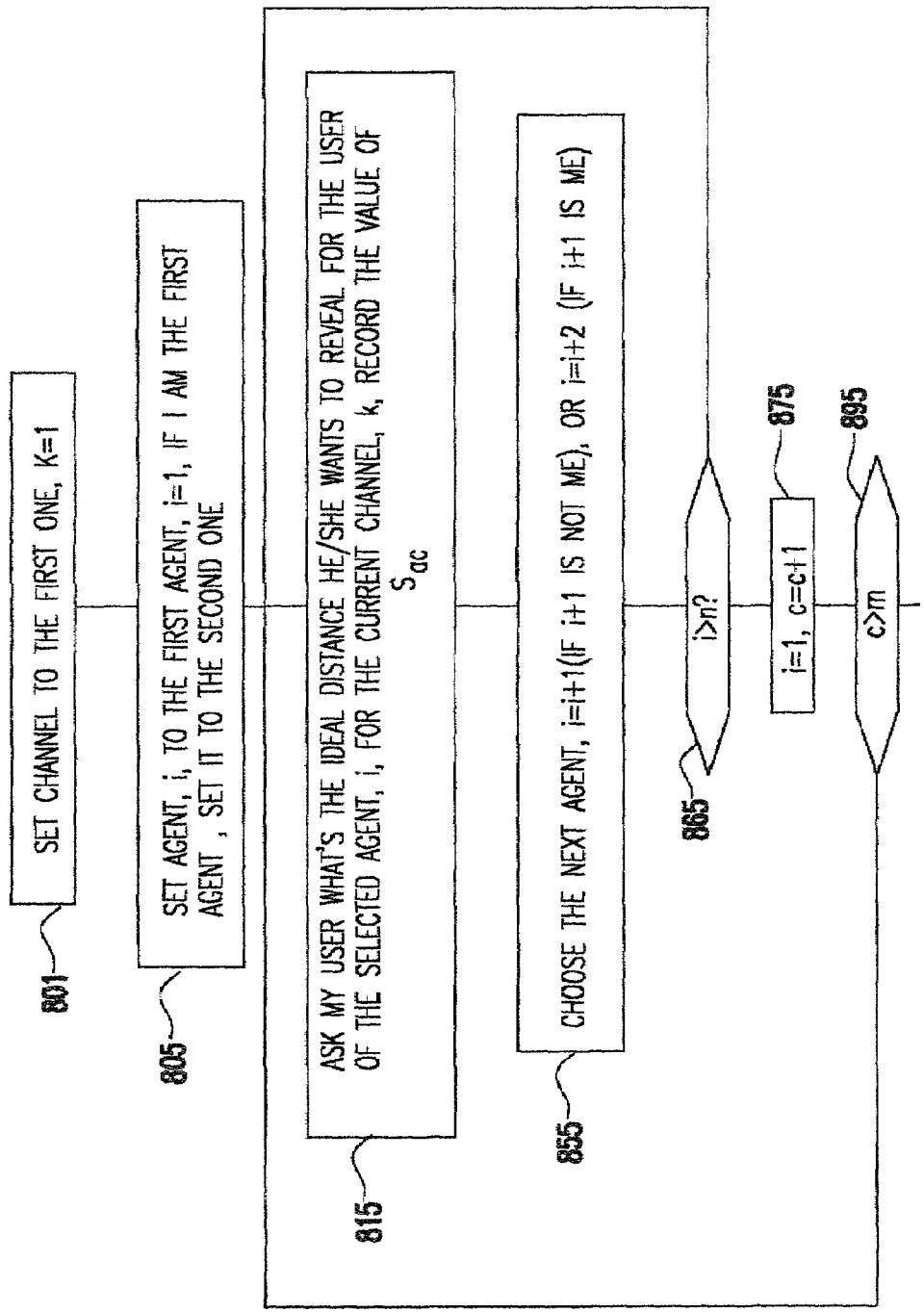
FIG. 8 is a flow diagram showing the process of obtaining ideal distance with respect to the agent at hand.

FIG. 8 is a flow diagram showing the process of obtaining an ideal distance with respect to the agent at hand. It actually fills one row of the matrix S. Function block 801 selects the first channel to set the ideal distance. Function block 805 choses the first agent other than the current agent in question. A processing loop is then entered at function block 815 where the ideal distance for the corresponding channel is set. It gives the value of $S_{ai}(k,e)$, where a is the agent for the current user in question. In function block 855, the next agent to consider is chosen. A determination is made in decision block 865 to determine if all the agents are considered. If so, the process goes to the next channel in function block 875; otherwise, the process loops back to function block 815 to choose the next agent. A determination is made in decision block 895 as to whether all the channels are considered and, if not, this process is repeated for all the possible events.

Figure 9:
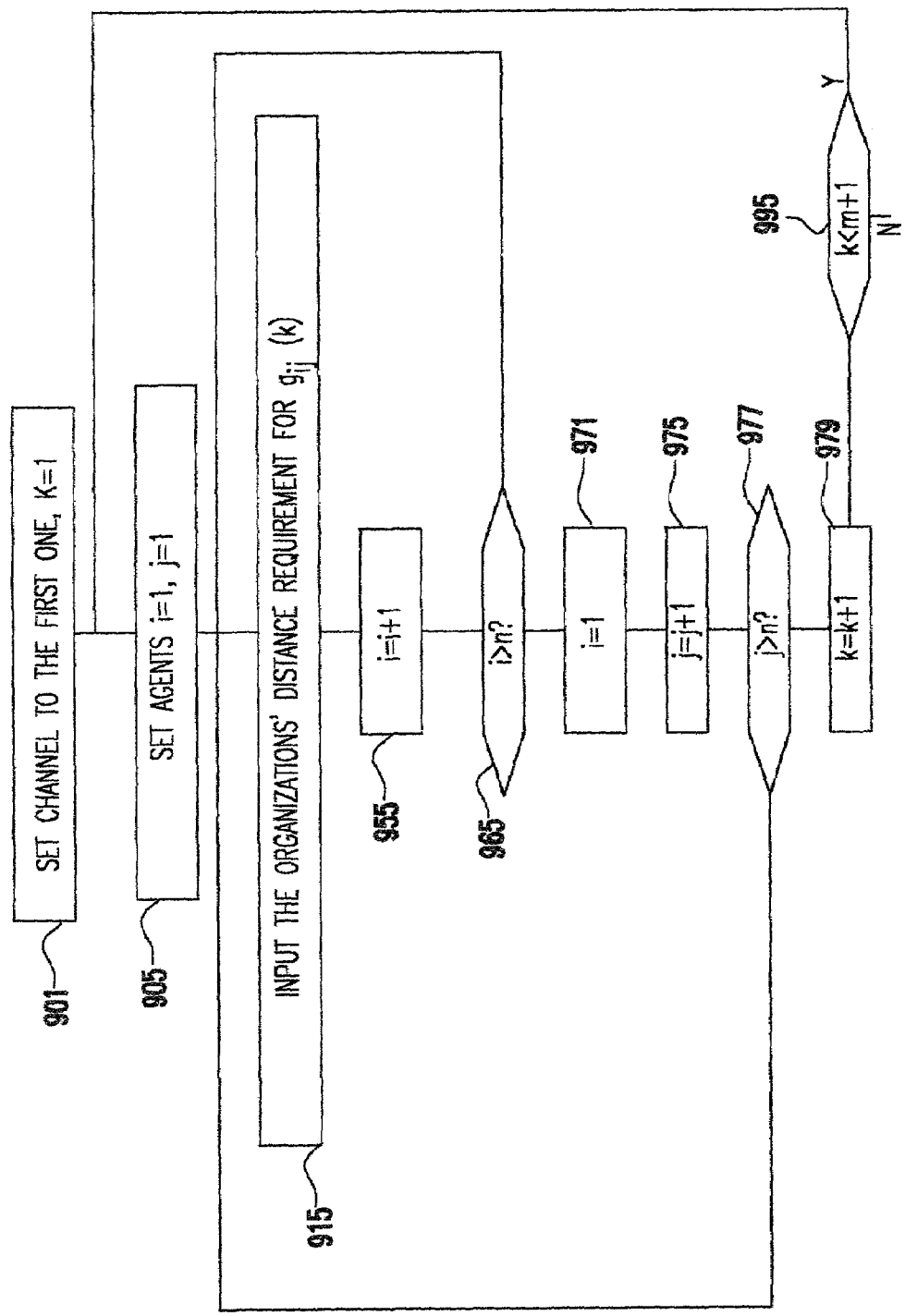
FIG. 9 is a flow diagram showing the process of obtaining ideal distance with respect to the organization.

FIG. 9 is a flow diagram showing the process of obtaining an ideal distance with respect to the organization. In function block 901, the first channel is chosen. The process enters a processing loop at function block 905 where the initial agents are set. A nested processing loop is entered at function block 915 where the values of $g_{ij}(k)$ are obtained. Function block 955 moves to the next distance start agent. Decision block 965 checks whether all the start agents are covered. If not, the process loops back to function block 915 to cover the next distance agent; otherwise, the process goes to function block 971 where the start agent is re-set to 1. Function block 975 moves to the next distance ending agent. Decision block 977 checks whether all the distance ending agents are covered. If not, the process loops back to function block 915 to cover the new distance start agent and the new distance ending agent; otherwise, the process goes to function block 979 to check the next channel. Decision block 995 checks whether all the channels are covered. If not, the process loops back to function block 905 to cover all the distance start agents and distance ending agents; otherwise, the process is finished.

Figure 10:
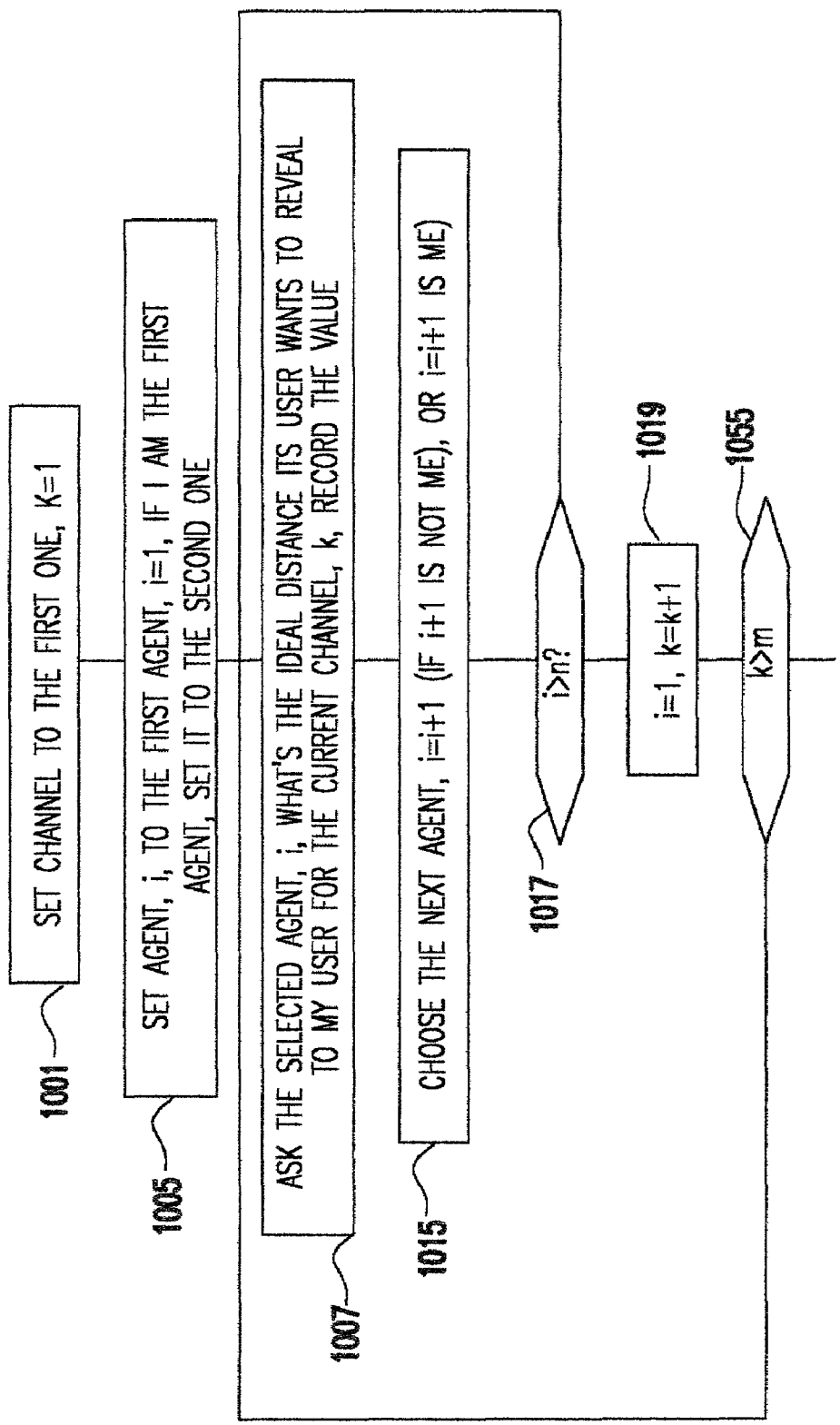
FIG. 10 is a flow diagram showing the process of obtaining ideal distance with respect to the other agents.

FIG. 10 is a flow diagram showing the process of obtaining an ideal distance with respect to the other agents. In function block 1001, the initial channel is set, and in function block 1005 the initial agent is set. A processing loop is entered in function block 1007 where the value of $o_{ai}(k)$ is set. Function block 1015 chooses the next agent. A determination is made in decision block 1017 as to whether all agents are covered. If so, in function block 1019, the next channel is chosen; otherwise, the process loops back to function block 1007. Then, in decision block 1055, a determination is made as to whether all channels are covered. If not, the process loops back to function block 1007; otherwise, the process is terminated.

Figure 11:
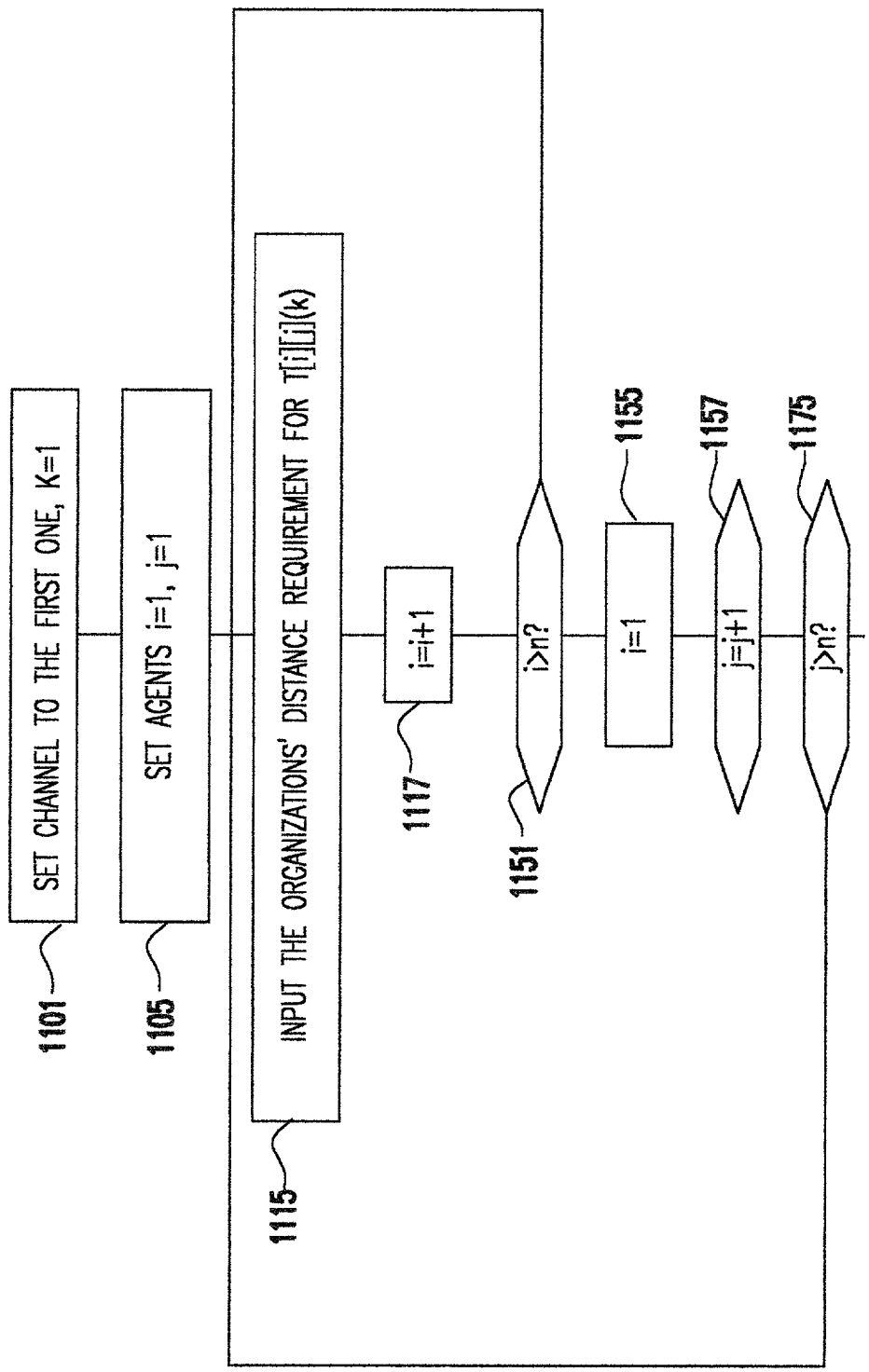
FIG. 11 is a flow diagram showing the process of obtaining ideal distance with respect to the current task.

FIG. 11 is a flow diagram showing the process of obtaining an ideal distance with respect to the current task. In function block 1101, the first channel is chosen. Function block 1105 sets the initial agents. Block 1115 sets the value of $t_{ij}(k)$. Function block 1117 moves to the next distance start agent. Decision block 1151 checks whether all the start agents are covered. If not, the process loops back to function block 1115 to cover the next distance ending agent; otherwise, the process goes to function block 1155 where the start agent is re-set to 1. Function block 1157 moves to the next distance ending agent. Decision block 1175 checks whether all the distance ending agents are covered. If not, the process loops back to function block 1115 to cover the new distance start agent and the new distance ending agent.

To proceed with other drawing figures, we need to specify several other matrices. Since we model the system as a spring system, we need to specify the constants for calculation. These constants will be used in calculating the best distances.

The spring constant that an agent want to provide to other agents is represented by matrix K_S:

$$K - S(k) = \begin{bmatrix} k - s_{11}(k) & \cdots & k - s_{1n}(k) \\ \vdots & \ddots & \vdots \\ k - s_{n1}(k) & \cdots & k - s_{mn}(k) \end{bmatrix},$$

where $k\_s_{ij}(k)$ gives the user i's spring constant for channel k from i to j. Here k can be any value from 1 ... m. When i=j, the value of $k\_s_{ii}=0$.

The spring constants that the organization want is represented by matrix K_G:

$$K - G(k) = \begin{bmatrix} k - g_{11}(k) & \cdots & k - g_{1n}(k) \\ \vdots & \ddots & \vdots \\ k - g_{n1}(k) & \cdots & k - g_{mn}(k) \end{bmatrix},$$

where $k\_g_{ij}(k)$ gives the value of the constant for channel k from i to j with respect to the organization. Here k can be any value from 1 ... m. When i=j, the value of $k\_g_{ii}=0$. For a given agent i, it can only access the i-th row of the matrix. Basically, the organization of the team may have some special requirement, these requirements will be one of the factors that might influence the final decisions of an agent.

The spring constants that the other agents want is represented by matrix K_O:

$$K - O(k) = \begin{bmatrix} k - o_{11}(k) & \cdots & k - o_{1n}(k) \\ \vdots & \ddots & \vdots \\ k - o_{n1}(k) & \cdots & k - o_{mn}(k) \end{bmatrix},$$

where $k\_o_{ij}(k)$ gives the value of the spring constant for channel k with regard to the issue that user j want user i to provide to him. Here k can be any value from 1 ... m. When i=j, the value of $k\_o_{ji}=0$. Agent i can only access the i-th row. Basically, this is the other agent's requirement. For a given agent, it must consider all the other agents' requirements.

The spring constant with respect to the given task is represented by matrix K_T:

$$K - T(k) = \begin{bmatrix} k - t_{11}(k) & \cdots & k - t_{1n}(k) \\ \vdots & \ddots & \vdots \\ k - t_{n1}(k) & \cdots & k - t_{mn}(k) \end{bmatrix},$$

where $k\_t_{ij}(k)$ gives the value of the spring constant for channel k from user i to user j. Here k can be any value from 1 ... m. When i=j, the value of $k\_g_{ii}=0$. Agent i can only access the i-th row.

Figure 12:
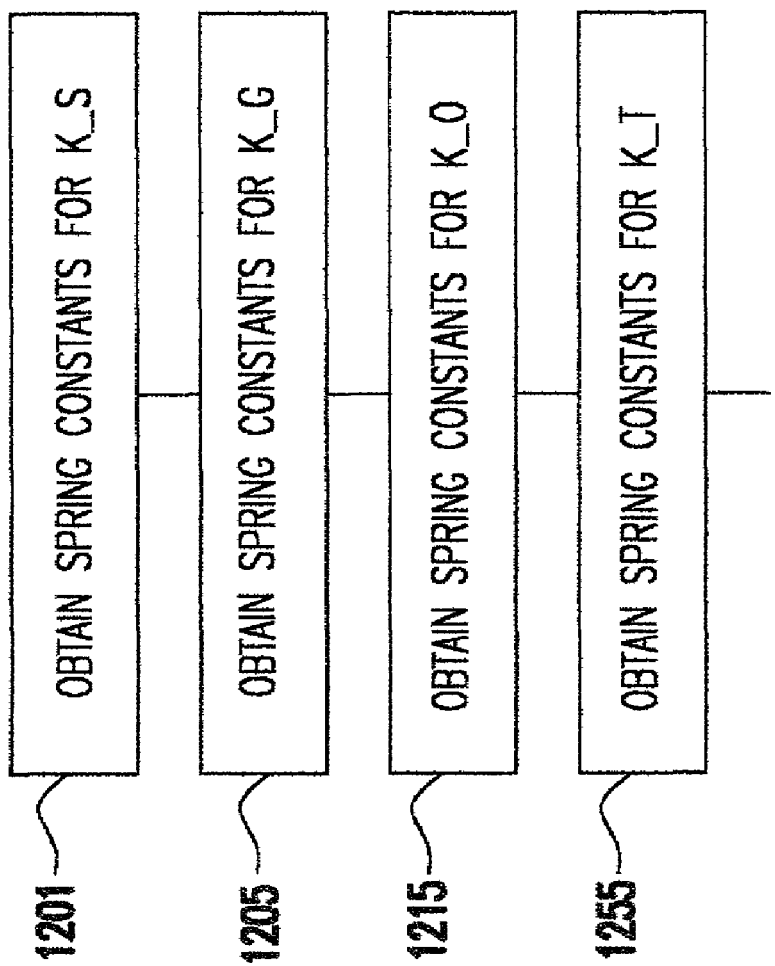
FIG. 12 is a flow diagram showing the process of obtaining spring constants for the system.

FIG. 12 is a flow diagram showing the process of obtaining spring constants for the system. In function block 1201, the values of K_S are obtained. In function block 1205, the values of K_G are obtained. In function block 1215, the values of K_O are obtained. Finally, in function block 1255, the values of K_T are obtained.

Figure 13:
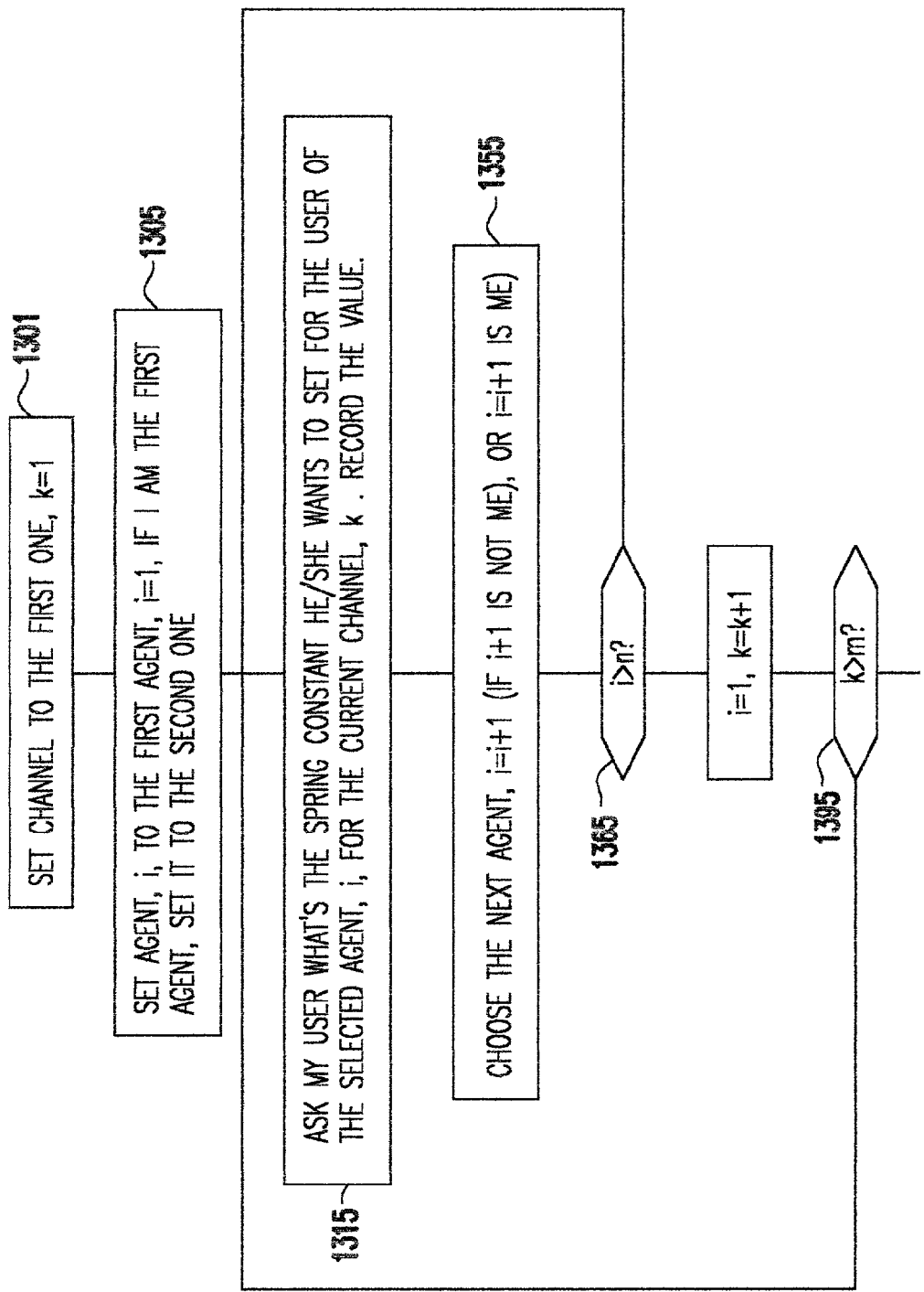
FIG. 13 is a flow diagram showing the process of obtaining spring constants for the agent's own user.

FIG. 13 is a flow diagram showing the process of obtaining spring constants for the agent's own user. It actually fills one row of the matrix K_S. In function block 1301, the first channel to set the spring constant is selected. Function block 1305 chooses the first agent other then the current agent in question. A processing loop is entered at function block 1315 where the spring constant for the corresponding channel is set. It gives the value of $K\_S_{ai}(k,e)$, where a is the agent for the current user in question. In function block 1355, the next agent to consider is chosen. A determination is made in decision block 1365 as to whether all the agents are considered and, if so, the process goes to the next channel; otherwise, the process loops back to function block 1315 to choose the next agent. Decision block 1395 checks whether all the channels are considered.

Figure 14:
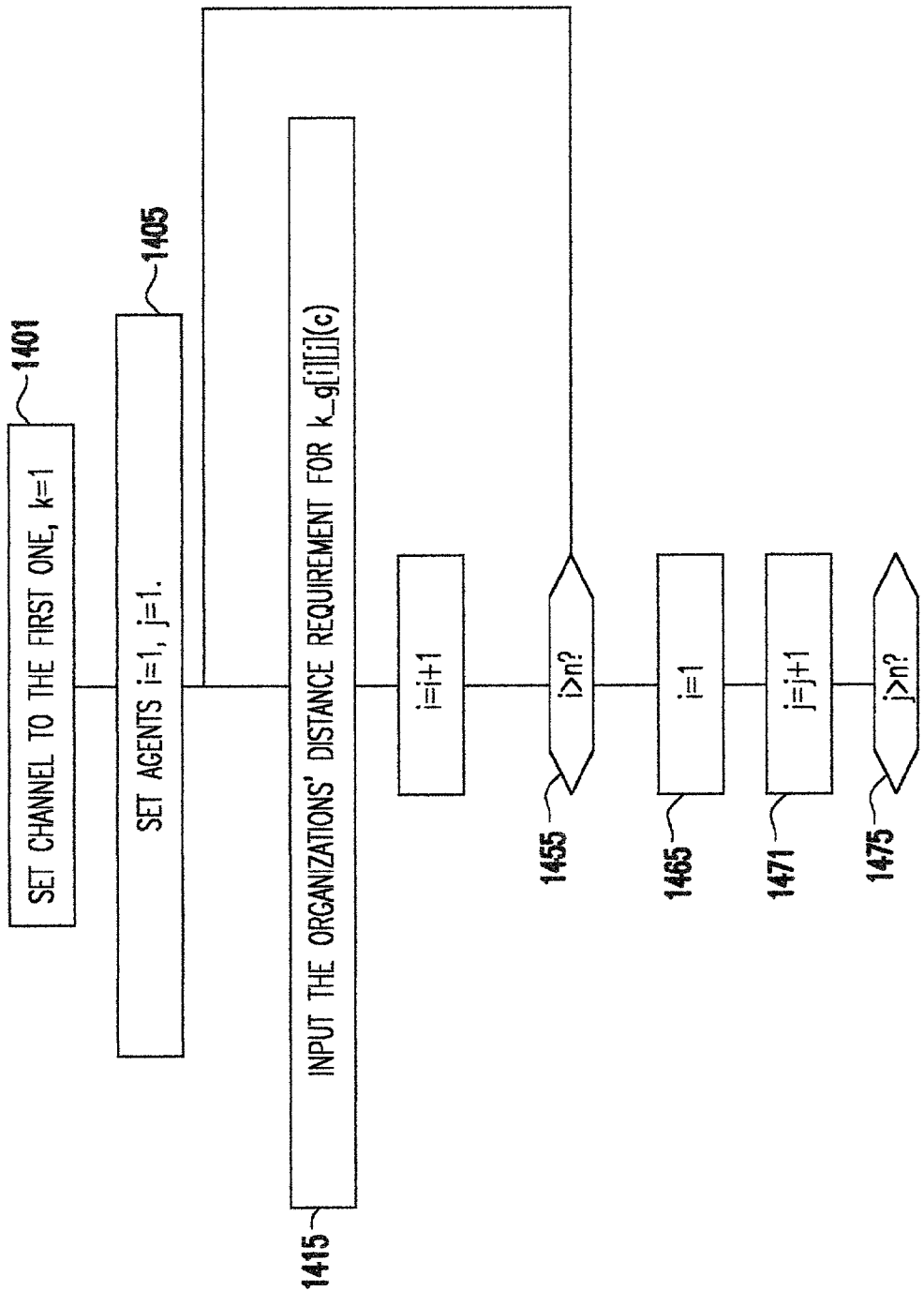
FIG. 14 is a flow diagram showing the process of obtaining spring constants for the organization.

FIG. 14 is a flow diagram showing the process of obtaining spring constants for the organization. In function block 1401, the constant for first channel is chosen. Function block 1405 sets the initial agents. A processing loop is entered at function block 1415 which obtains the values of $k\_g_{ij}(k)$. Function block 1451 moves to the next distance start agent. Decision block 1455 checks whether all the start agents are covered. If not, the process loops back to function block 1415 to cover the next distance start agent; otherwise, the process goes to function block 1465 where the start agent is re-set to 1. Function block 1471 moves to the next distance ending agent. Decision block 1475 checks whether all the distance ending agents are covered. If not, the process loops back to function block 1415 to cover the new distance start agent and new distance ending agent; otherwise, the process is finished.

Figure 15:
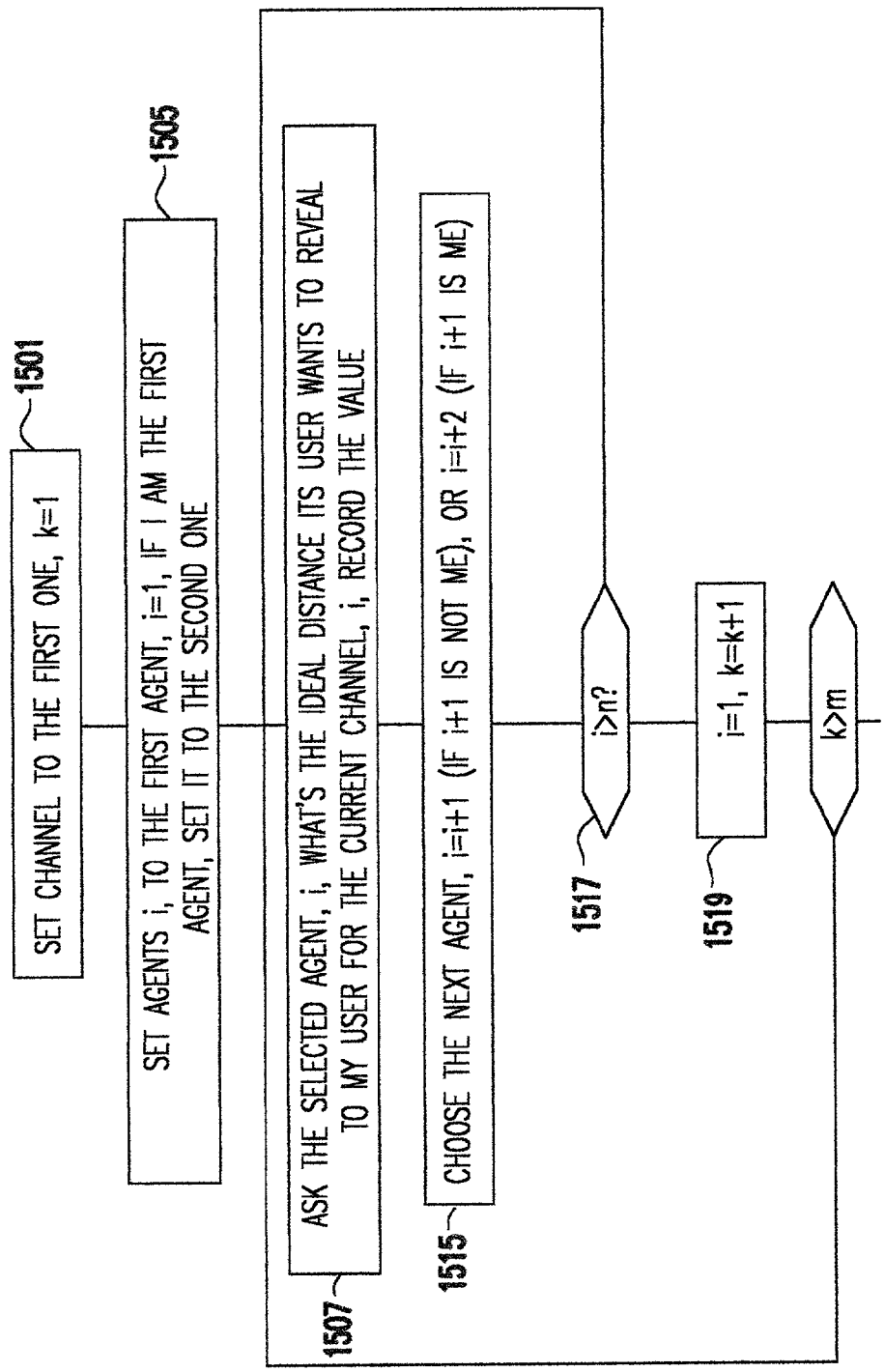
FIG. 15 is a flow diagram showing the process of obtaining spring constants for other agents.

FIG. 15 is a flow diagram showing the process of obtaining spring constants for other agents. Function block 1501 sets the initial channel, and function block 1505 sets the initial agent. A processing loop is entered at function block 1507 where the value of $k\_o_{ai}(k)$ is set. In function block 1515, the next agent is chosen. Decision block 1517 checks whether all agents are covered and, if not, the process loops back to function block 1507. Function block 1519 chooses the next channel.

Figure 16:
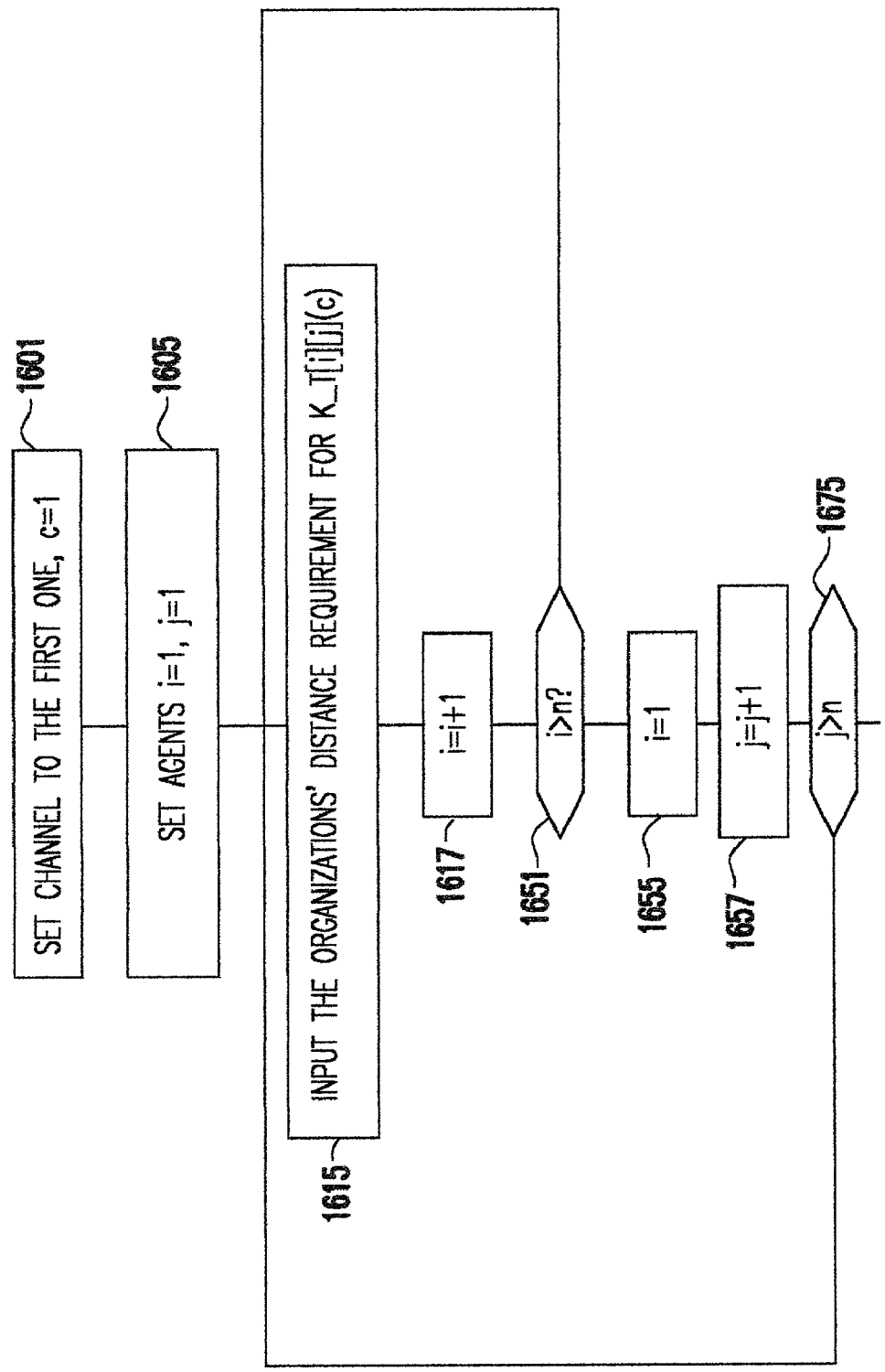
FIG. 16 is a flow diagram showing the process of obtaining spring constants for the current task.

FIG. 16 is a flow diagram showing the process of obtaining spring constants for the current task. In function block 1601, the first channel is chosen. Function block 1605 sets the initial agents. A processing loop is entered at function block 1615 where the value of k_t$_{ij}$(k) is set. Function block 1617 moves to the next distance start agent. Decision block 1651 checks whether all the start agents are covered. If not, the process loops back to function block 1615 to cover the next distance start agent; otherwise, the process goes to function block 1655 where the start agent is re-set to 1. Function block 1657 moves to the next distance ending agent. Decision block 1675 checks whether all the distance ending agents are covered. If not, the process loops back to function block 1615 to cover the new distance starting agent and the new distance ending agent; otherwise the process is finished.

To illustrate the emphasis of different factors for different agents, we use weight matrices to represent those weights. For different agents, the current agent at hand will have different weights. The weights are channel free, because the channel preference is encoded by spring constants.

The weights that related to agents' own preference is represented by matrix W_S:

$$W - S(k) = \begin{bmatrix} w - s_{11}(k) & \cdots & w - s_{1n}(k) \\ \vdots & \ddots & \vdots \\ w - s_{n1}(k) & \cdots & w - s_{mn}(k) \end{bmatrix},$$

where w_s$_{ij}$ gives the value of the weight that agent i assigned to the distance from i to j with considering its user's own need. When i=j, the value of w_s$_{ij}$=0. Please note that each row represent the needs of each user. Agent i can only access the i-th row.

The weights that related to an agent's idea on the importance of the organization is represented by matrix W_G:

$$W - G(k) = \begin{bmatrix} w - g_{11}(k) & \cdots & w - g_{1n}(k) \\ \vdots & \ddots & \vdots \\ w - g_{n1}(k) & \cdots & w - g_{mn}(k) \end{bmatrix},$$

where w_g$_{ij}$ gives the value of the weight that agent i assigned to the distance from i to j with considering the influence of the organization. When i=j, the value of w_g$_{ij}$=0. Agent i can only access the i-th row.

The weights that related to an agent's idea on the importance of the other agents is represented by matrix W_O:

$$W - O(k) = \begin{bmatrix} w - o_{11}(k) & \cdots & w - o_{1n}(k) \\ \vdots & \ddots & \vdots \\ w - o_{n1}(k) & \cdots & w - o_{mn}(k) \end{bmatrix},$$

where w_o$_{ij}$ gives the value of the weight that agent i assigned to the distance from i to j with considering the importance of user j. When i=j, the value of w_o$_{ij}$=0. In other words, it represents the importance of the other agents' requirement on how much information agent i should release to agent j. Agent i can only access the i-th row.

The weights that related to an agent's idea on the importance of a given task is represented by matrix W_T:

$$W - T(k) = \begin{bmatrix} w - t_{11}(k) & \cdots & w - t_{1n}(k) \\ \vdots & \ddots & \vdots \\ w - t_{n1}(k) & \cdots & w - t_{mn}(k) \end{bmatrix},$$

where w_t$_{ij}$ gives the value of the weight that agent i assigned to the distance from i to j with considering the importance of the requirement of the task.

Figure 17:
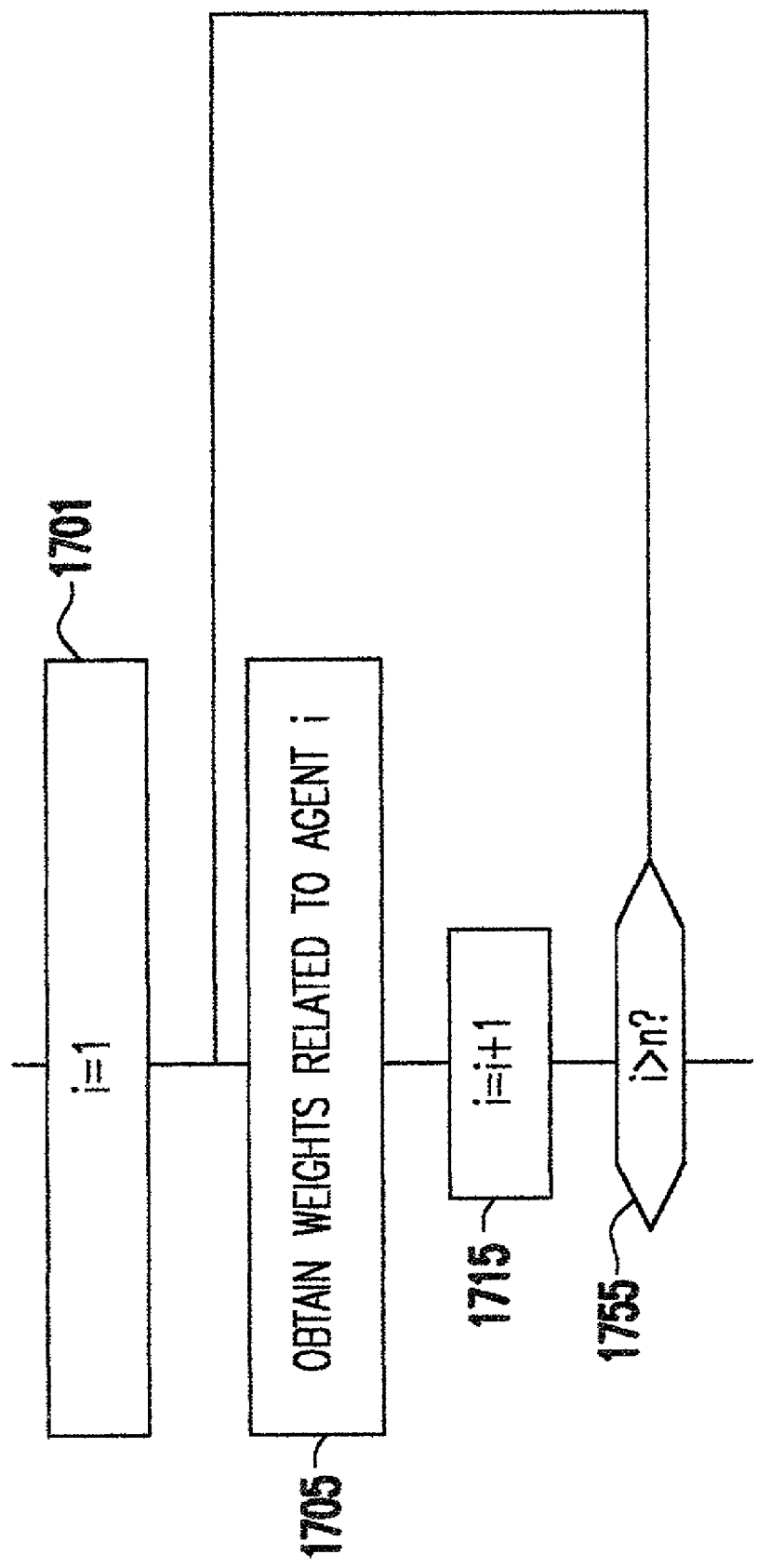
FIG. 17 is a flow diagram showing the process of generating the Event-Weight table.

FIG. 17 is a flow diagram showing the process of obtaining the weights for all of the agents. Each agent maintains only those weights that relate to itself. In function block 1701, the first agent chosen. A processing loop is entered at function block 1705 where the chosen agent is asked to provide related weights. Function blocks 1715 indexes the next agent, and decision block 1755 determines whether all agents have been processed.

Figure 18:
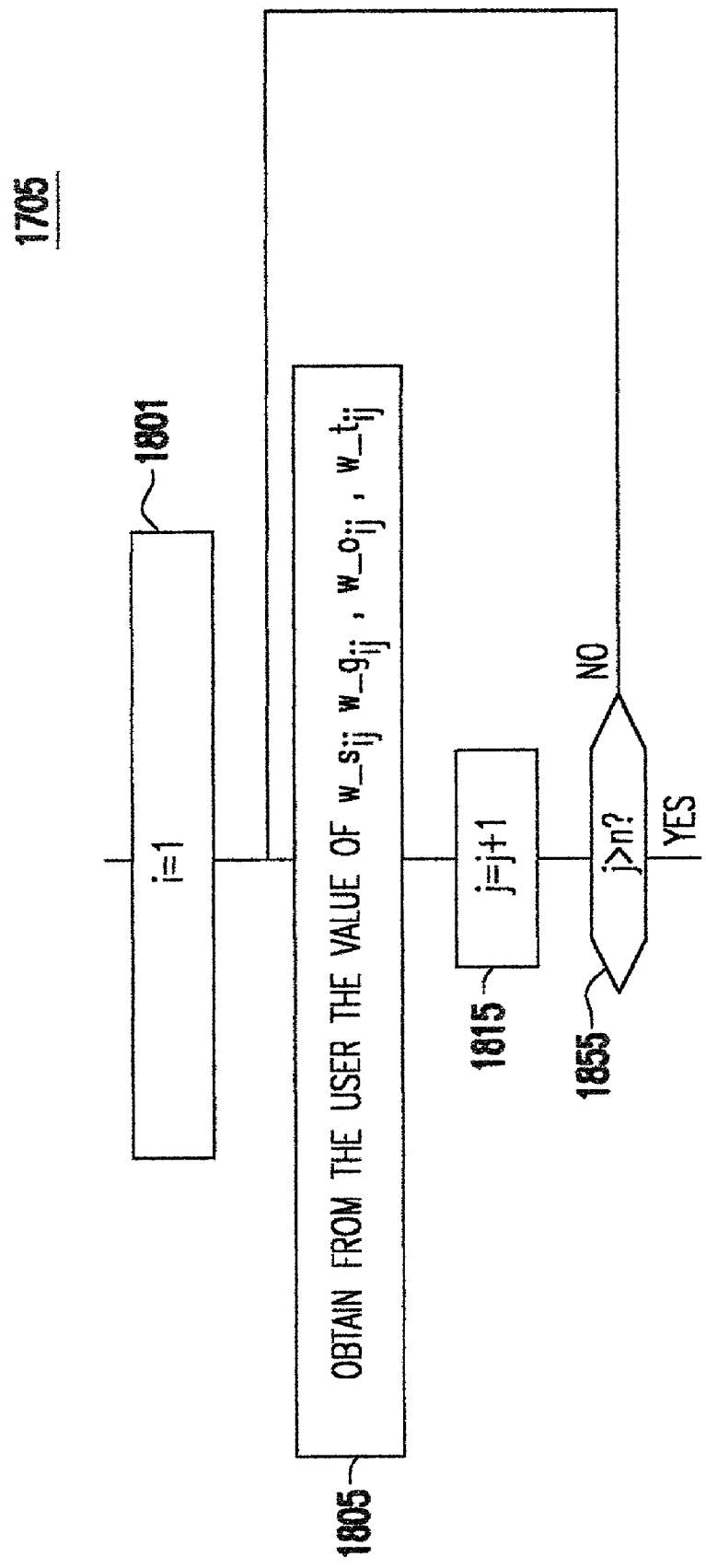
FIG. 18 is a flow diagram showing the process of obtaining values from the Event-Weight table.

FIG. 18 is a flow diagram showing the process of obtaining the weight value related to a given agent i. In function block 1801, the other agent is set as agent 1. A processing loop is entered at function block 1805 where the user i is asked to input the weight values w_s$_{ij}$, w_g$_{ij}$, w_o$_{ij}$, and w_t$_{ij}$. These are weights that are related to agent i when it is trying to make decisions during the distance selection process. These values also register the personalities of agent i. Function block 1815 considers the next agent. Decision block 1855 checks whether all the other agents are considered.

Figure 19:
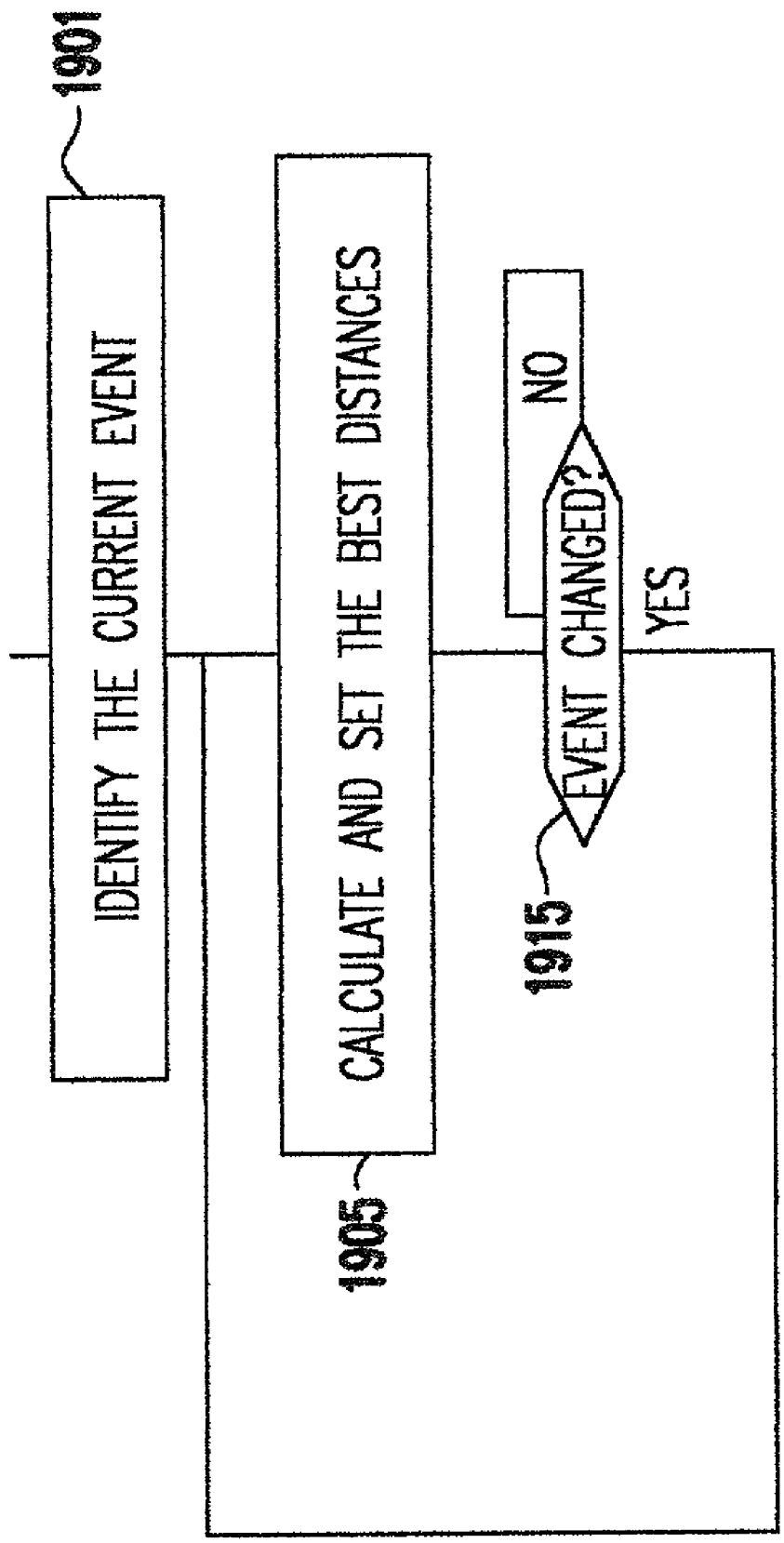
FIG. 19 is a flow diagram showing the working process of the system.

FIG. 19 is a flow diagram showing the working process of the system. Function block 1901 first identifies the current event with respect to its user. A processing loop is entered at block 1905 which calculates and set the best distances for all the channels. Details of this process is explained with reference to FIG. 20. Decision block 1915 checks whether the event has changed. If the event is not changed, no action is needed. Otherwise, the process loops back to function block 1905 to re-calculate the best distances for all the channels.

Figure 20:
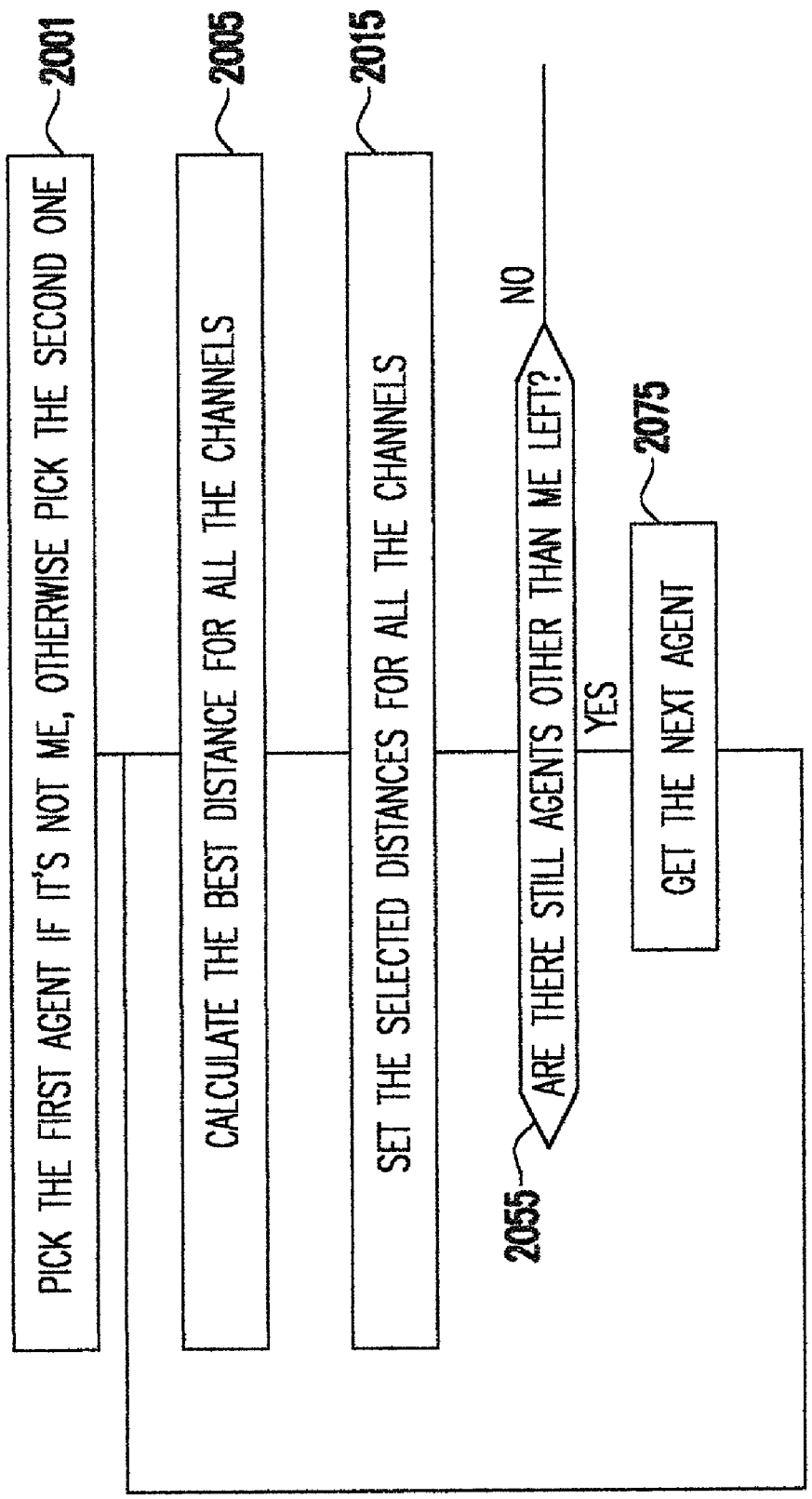
FIG. 20 is a flow diagram showing the process of online distance selection for a given event.

FIG. 20 is a flow diagram showing online distance selection for a given event e. Function block 2001 chooses the first user for distance calculation. This is because that the agent of the current user needs to determine the distance from the current user to all the other users respectively, and this has to be done one by one. A processing loop is entered at function block 2005 where the best distances for all the channels is calculated. The description of FIG. 21 will explain this more. Function block 2015 sets the selected distances for all the channels for the current agent in consideration. Decision block 2055 checks whether there are agents that have not been considered. If so, function block 2075 moves to the next agent for which the distance has not been assigned.

Figure 21:
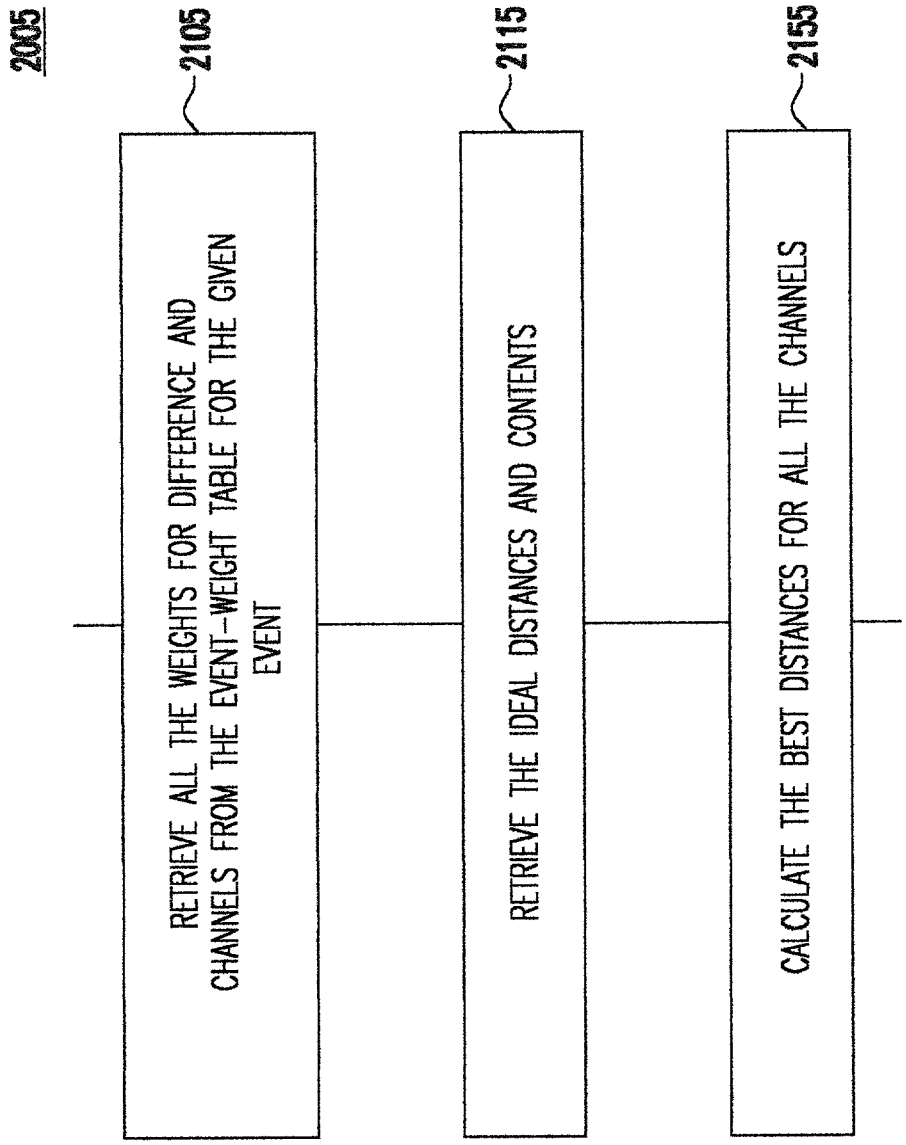
FIG. 21 is a flow diagram showing the process of best distance calculation.

FIG. 21 is a flow diagram showing the best distance calculation. Function block 2105 retrieves all the weights related to the current user. Please note that the given agent can only access those weights related to its user. Function block 2115 retrieves the ideal distance and constants. Function block 2155 calculates the best distance. It uses spring model to find the distance that minimizes the potential energy. The theory goes as follows. Suppose that the task right now is to determine the distance of channel k from agent i to agent j. Suppose that x is the ideal distance.

$$\psi = w\_s \times \gamma_s(x, k) + w\_g \times \gamma_g(x, k) + w\_o \times \gamma_o(x, k) + w\_t \times \gamma_t(x, k),$$

where $$\gamma_s(x, k) = \int_x^{s_{ij}(k,e)} [k - s_{ij}(k) \times y] dy = 1/2k - s_{ij}(k)[x - s_{i,j}(k, e)]^2,$$

$$\gamma_g(x, k) = \int_x^{g_{ij}(k,e)} [k - g_{ij}(k) \times y] dy = 1/2k - g_{ij}(k)[x - g_{i,j}(k, e)]^2,$$

$$\gamma_o(x, k) = \int_x^{o_{ij}(k,e)} [k - o_{ij}(k) \times y] dy = 1/2k - o_{ij}(k)[x - o_{i,j}(k, e)]^2, \text{ and}$$

$$\gamma_t(x, k) = \int_x^{t_{ij}(k,e)} [k - t_{ij}(k) \times y] dy = 1/2k - t_{ij}(k)[x - t_{i,j}(k, e)]^2.$$

Thus, it is easy to know that $$2\psi = w\_s \times k\_s_{ij}(k)[x^2 - 2xs_{ij}(k, e) + s_{ij}(k, e)^2] +$$
$$w\_g \times k\_g_{ij}(k)[x^2 - 2xg_{ij}(k) + g_{ij}(k)^2] +$$
$$w\_o \times k\_o_{ij}(k)[x^2 - 2xo_{ij}(k, e) + o_{ij}(k, e)^2] +$$
$$w\_t \times k\_t_{ij}(k)[x^2 - 2xt_{ij}(k) + t_{ij}(k)^2]$$

Obviously, when $$x = \frac{w-s \times k-s_{ij}(k,e) + w-g \times k-g_{i,j}(k) \times g_{ij}(k) +}{w-s \times k-s_{ij}(k) + w-g \times k-g_{i,j}(k) +} \\ \frac{w-o \times k-o_{ij}(k) + w-t \times k-t_{ij}(k) \times t_{ij}(k)}{w-o \times k-o_{ij}(k) + w-t \times k-t_{ij}(k)}$$

the potential energy reaches its minimum. Thus, $$\frac{w-s \times k-s_{ij}(k,e) + w-g \times k-g_{i,j}(k) \times g_{ij}(k) +}{w-s \times k-s_{ij}(k) + w-g \times k-g_{i,j}(k) +} \\ \frac{w-o \times k-o_{ij}(k) + w-t \times k-t_{ij}(k) \times t_{ij}(k)}{w-o \times k-o_{ij}(k) + w-t \times k-t_{ij}(k)} \text{ is}$$

the value of the distance selected by function block 2155.

In most application applications, it is difficult to provide stiffness functions and to calculate the back-to-ideal potential energies as described above. Furthermore, it might also be difficult to compare different distances given the multi-model nature of the system. In order to avoid these difficulties, we propose a method that uses a set of back-to-ideal energy difference vectors and matrices to guide agents in the selection of distances.

Suppose there are a total of M different ways to expose one user's status to another user. These M different ways correspond to M different distances $d_1, \ldots, d_M$ among users. From a certain point of view, these distances encode the Z different virtual walls among team members. Suppose that there are a total of Q different events to be concerned with respect to users in the system.

The back-to-ideal potential energy matrix from i to j with respect to user i, $H_{ij}^i$, is given $$H_{ij}^i = \begin{bmatrix} h_{11}^i & \cdots & h_{1M}^i \\ \vdots & \ddots & \vdots \\ h_{Q1}^i & \cdots & h_{QM}^i \end{bmatrix},$$

where $h_{uv}^i$ gives the back-to-ideal potential energy when user i is at event u and agent i selected distance $d_v$ as the distance from i to j. If distance $d_v$ happens to be the ideal distance from i to j under event u with respect to agent i, then $h_{uv}^i=0$. in general, although user i might be at different states, only some special events might have different ideal distances. In most situations, user i's ideal distance will be the same, Matrix $H_{ij}^i$ is available to agent i at the beginning and is specified by user i. The values of the elements of $H_{ij}^i$ encode the degrees of frustrations or tensions user i has for different selected distances under different events.

Figure 22:
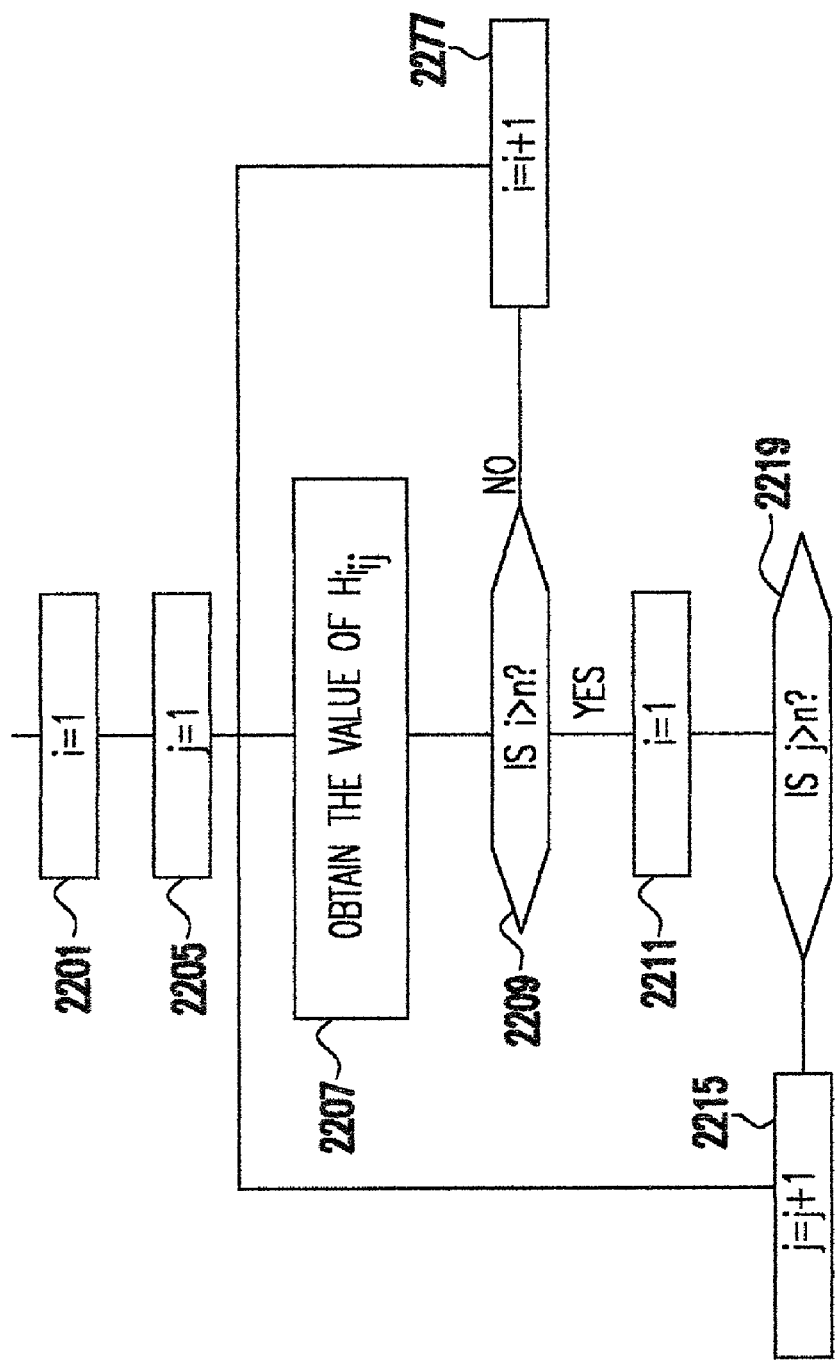
FIG. 22 is a flow diagram showing the process of obtaining the values of the back-to-ideal potential energy matrix.

FIG. 22 is the flow diagram showing the process of obtaining the values of the Matrix $H_{ij}^i$ for all the i and j. We set the frustration range to be between 0 and 100. The higher the frustration, the higher the value will be. Suppose that there are totally E events to be considered for any agent. The process is initialized by setting i to the first agent in function block 2201 and setting j to the first agent in function block 2205. A processing loop is entered in function block 2207 where the value for $H_{ij}^i$ is obtained. A determination is made in decision block 2209 as to whether i is bigger than the total number of agents, n. If not, the index i is incremented by 1 in function block 2277, and then the process loops back to function block 2207. If i is bigger than n, then the index i is reset to 1 in function block 2211. A determination is made in decision block 2219 as to whether j is bigger than n. If so, obtained all the matrices have been obtained; otherwise, the index j is incremented by 1 in function block 2215, and the process loops back to function block 2207.

Figure 23:
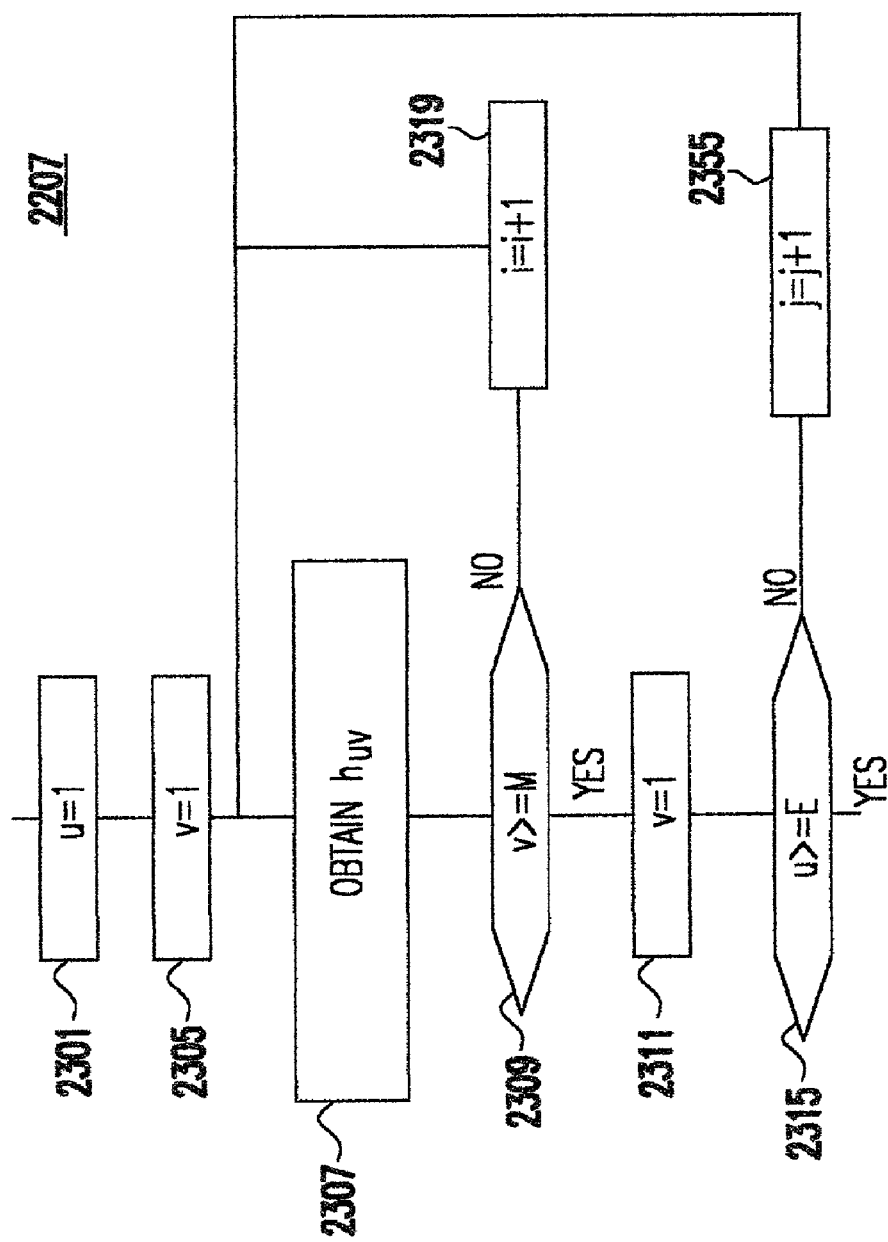
FIG. 23 is a flow diagram showing the process of obtaining the values of the elements of the back-to-ideal potential energy matrix.

FIG. 23 is a flow diagram showing the process of obtaining the value of $h_{uv}$. Suppose the M different ways of reveal one user's status to another user's status are: $d_1, \ldots, d_M$. Suppose that there are totally E different events that are of interests of the users within the system. The process is initialized by setting u to be the first event in function block 2301 and setting v to be the first way of reveal a user's status in function block 2305. A processing loop is entered in function block 2307 where the value of $h_{uv}$ is input. This is done by asking user i the question, "what will be the frustration value for user i if, under the event u, the information of user i revealed to user j will be in the status of $d_v$". User i will input a frustration value between 0 and 100, a determination is made in decision block 2309 as to whether v is equal to or bigger than M. If not, v is incremented by 1 in function block 2319, and then the process loops bact to function block 2307. If v is bigger than M, v is reset to 1 in function block 2311. A determination is made in decision block 2315 as to whether u is equal to or bigger than E. If not, u is incremented by 1 in function block 2355, and then the process loops back to function block 2307; otherwise, the process is completed.

The back-to-ideal potential energy vector from i to j with respect to the organizational structure is given by $H_U^{su}= (h_1^{su}, \ldots, h_M^{su})$, where $h_{vsu}$ gives the back-to-ideal potential energy with respect to the organization when agent i selects $d_v$ as the distance from i to j. If $h_v^{su}=0$, then $d_v$ is the ideal distance. The vector $H_U^{su}$ is provided by the organization to agent i at the beginning. Thus the calculation of $\delta_2(<s_1, \ldots, s_M>)$ is avoided during the run time.

Figure 24:
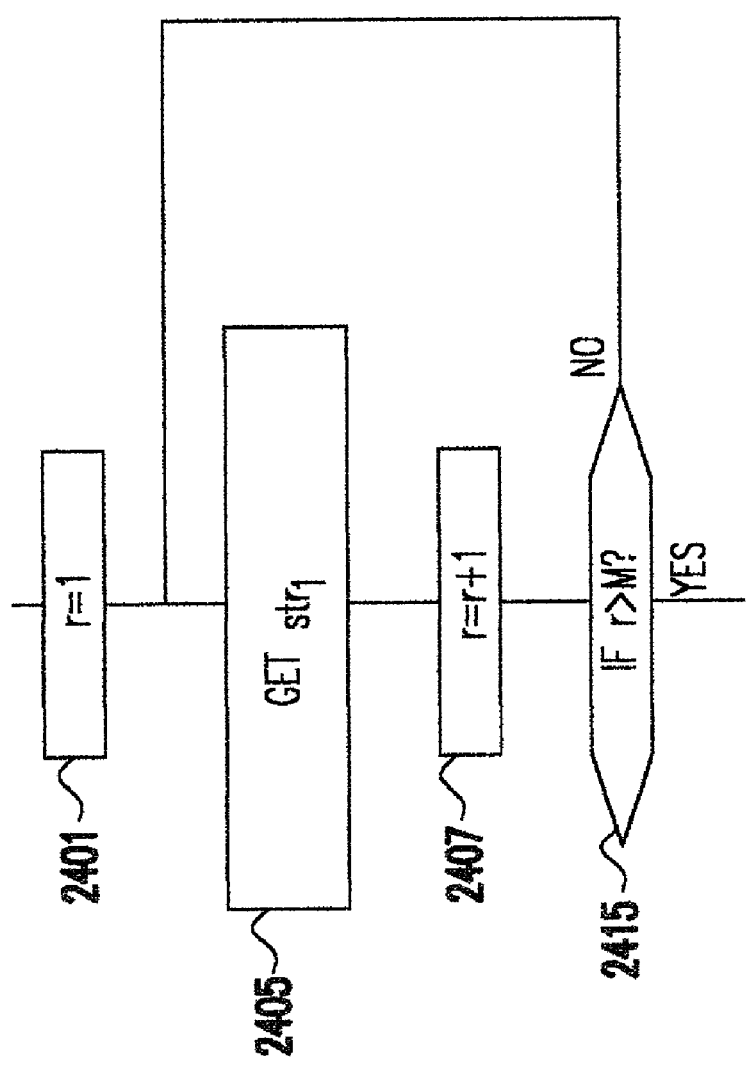
FIG. 24 is a flow diagram showing the process of obtaining the back-to-ideal potential energy vector.

FIG. 24 is a flow diagram showing the process of obtaining the value of $H_U^{su}=(h_1^{su}, \ldots, h_M^{su})$. The process is initialized by setting r to 1 in function block 2501. Then a processing loop is entered at function block 2405 where the value of $h_v^{su}$ is obtained. This is done by inputting the frustration from the organization point of view if the information of user i revealed to user j is in the form of $d_r$. The value of r is incremented in function block 2407. Then a determination is made in decision block 2415 as to whether r is bigger than M. If not, the process loops back to function block 2405; otherwise, the value of $H_U^{su}$ is obtained. Similarly, this process should be executed for every different pair of i and j.

The back-to-ideal potential energy vector from i to j with respect to agent j is given by $H_U^j=(h_1^j, \ldots, h_M^j)$, where $h_v^j$ gives the back-to-ideal potential energy with respect to agent j when agent i selects $d_v$ as the final distance. This vector encodes agent j's preference on distances and is given by user j to agent j and is then passed by agent j to agent i. The calculation of $\delta_3(<s_1, \ldots, s_M>)$ is thus avoided.

Figure 25:
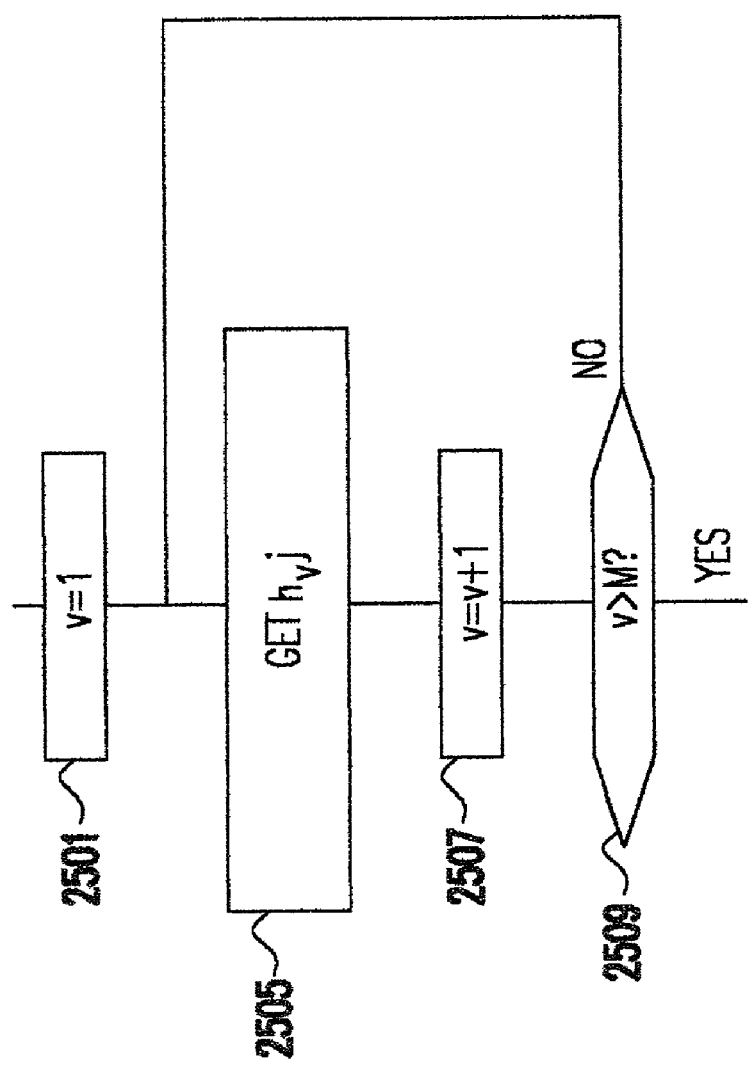
FIG. 25 is a flow diagram showing the process of obtaining the back-to-ideal potential energy vector from i to j with respect to agent j.

FIG. 25 is a flow diagram showing the process of obtaining the value of $H_{ij}^j=(h_1^j, \ldots, h_M^j)$ The process is initialized by setting v to 1 in function block 2501. A processing loop is entered in function block 2505 where user j is asked for the value of $h_v^j$. The value of v is incremented by one in function block 2507. Then a determination is made in decision block 2509 as to whether v is bigger than M. If not, the process loops back to function block 2505. Otherwise, $H^{ij}$ is obtained. This process should be executed for every different pair of i and j.

The back-to-ideal potential energy vector from i to j with respect to a given task $t_q$ is given by $H_U^{t_q}=(h_1^{t_q}, \ldots, h_M^{t_q})$ where $h_v^{t_q}$ gives the back-to-ideal potential energy when agent i selects $d_v$ as the distance from i to j. The awareness requirements for a collaborative task might be given by the authority who assigns the task, or by the group conventions about the awareness level of the task, or by the system according to various experiences inputted by users. In general, the system divides collaborative tasks into different categories according to the degree of awareness requirements for each member. It stores these tasks and the associated back-to-ideal potential energy vectors in a common place such that each agent can retrieve the corresponding vector according to its role in the team. The potential energy vectors for all the tasks are available at the beginning, thus the calculation of $\delta(<s_{11}, \ldots, s_M>)$ is avoided.

Figure 26:
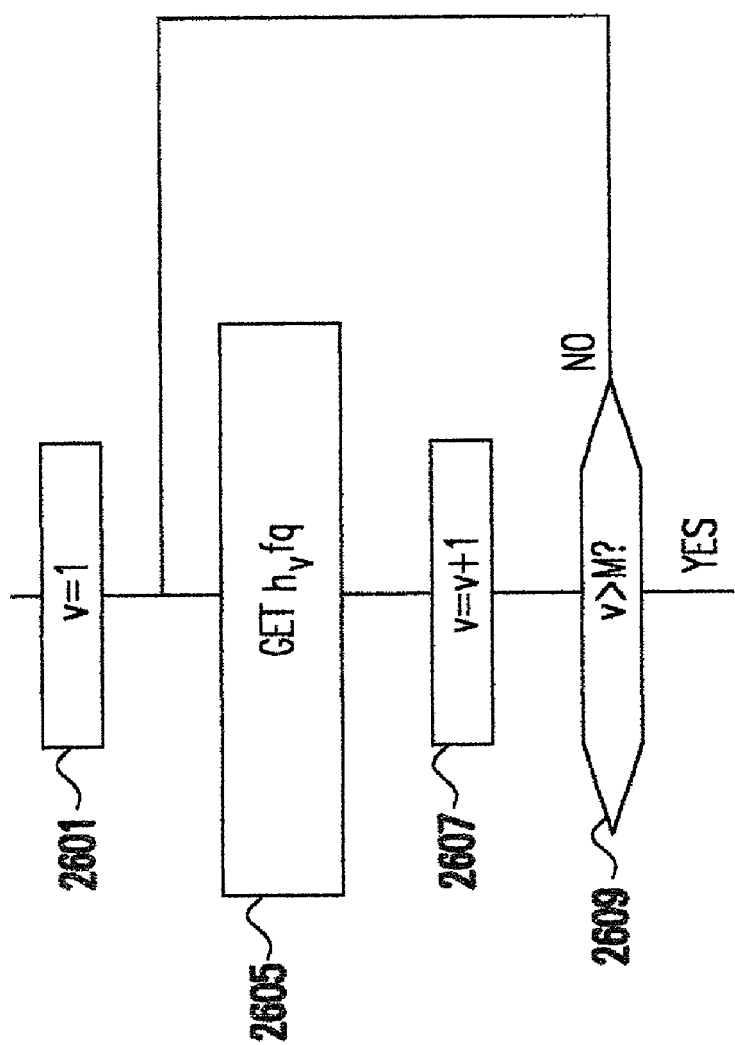
FIG. 26 is a flow diagram showing the process of obtaining the back-to-ideal potential energy vector from i to j with respect to a given task $t_q$.

FIG. 26 is a flow diagram showing the process of obtaining the value of $H_U^{t_q}=(h_1^{t_q}, \ldots, h_M^{t_q})$. The process is initialized by setting v to 1 in function block 2601. A processing loop is entered in function block 2605 where the value of $h_v^{t_q}$ is retrieved for the given task. The value of v is incremented by 1 in function block 2607. Then a determination is made in decision block 2609 as to whether v is bigger than M. If not, the process loops back to function block 2605; otherwise, $H_{ij}^{t_q}$ is obtained. This process should be executed for every different pair of i and j, and for every task $t_q$.

As discussed above, the related back-to-ideal potential energies are all available for agent i. Thus, when a new collaboration task is assigned to user i or a new event is happening to user i, agent i will update the distances from its user to all the other related users.

Suppose that at time $\tau$, user i is at the state of event u and the current collaboration task is $t_q$, then the weighted back-to-ideal potential energies for distance $d_v$ is $\delta_v=w_U^j \times h_{uv}^i +$ $w_U^{su} \times h_v^{wu} + w_U^j \times h_v^j + w_U^{sak} \times h_v^{t_q}$. To select the best distance, agent i calculates the weighted back-to-ideal potential energies $\delta(d_1), \ldots, \delta(d_M)$ for all the distances $d_1, \ldots, d_M$ and chooses the distance d with the minimum energy as the value of $d_{i,j}(\tau)$, the distance from i to j at time $\tau$. In other words, if $\delta(d) \leq \delta(d_v)$ (v=1, ..., M), then $d_{i,j}(\tau)=d$.

At the beginning, all the distances within the system select their awareness distances to all the other agents according to the above method by assuming that there is no collaboration task. Thus, only the first three terms are involved in the calculation: $\delta_v=w_U^j \times h_{uv}^i + w_U^{su} \times h_v^{wu} + w_U^j \times h_v^j$. After $\Psi(o)$ is determined, if there is no change in the status of any users and there is no new task, then the awareness status of the system will stay the same. This status will be updated whenever there are changes in events or tasks. When a change occurs, each related agent will update its distances to all the other agents according to the above described method. The awareness status $\Psi(\tau)$ of the system is a system that is adaptive to events and tasks. Each element $d_{i,j}(\tau)$ of $\Psi(\tau)$ is an adaptive media wall in the virtual organization of the system. It is these virtual walls that keep the organization functioning and provide adaptive awareness to all the members of the team.

In the event that the spring model solution is difficult to obtain, a mixed approach of the spring model and the following mechanism may be used. A matrix and vector look up model can be used to determine the distances among distributed users. The values of the matrix and the vector encodes the preferences of the user, the preferences of the task, the preferences of the organization, and the preference requirements of the other user who receives the awareness information.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for automatically determining awareness settings among people in a distributed working environment comprising the steps of:
   receiving real-time data produced by an event; and
   automatically adjusting a distance according to a degree of clarity, desired by individual users, of a corresponding signal received from another party and a need of a collaborative project to have some shared information about individual user activities using an elastic spring energy model, wherein a matrix and vector look up model is used to determine the distances among distributed users, the values of the matrix and the vector encoding preferences of a user and preference requirements of another user.

2. The method for automatically determining awareness settings among people in a distributed working environment recited in claim 1, wherein the step of automatically adjusting a distance is performed by a multi-agent system that automatically and selectively provides perceived information to others based on perceived events or status associated with others.

3. The method for automatically determining awareness settings among people in a distributed working environment recited in claim 2, wherein the elastic spring energy model governs reaction of an information system in real time when events or status changes.

4. The method for automatically determining awareness settings among people in a distributed working environment recited in claim 2, wherein each agent acts on its user's behalf to adjust an awareness level among different users.

5. The method for automatically determining awareness settings among people in a distributed working environment recited in claim 1, further comprising the step of dividing communications between different users into different channels and specifying a clearness level for each channel.

6. The method for automatically determining awareness settings among people in a distributed working environment recited in claim 1, wherein the elastic spring energy model is a dynamic model so that the step of automatically adjusting a distance takes into consideration events which happen at each user's site.

7. The method for automatically determining awareness settings among people in a distributed working environment recited in claim 1, wherein the elastic spring energy model determines potential energy vectors which encode a user's preference on distances.

8. The method for automatically determining awareness settings among people in a distributed working environment recited in claim 1, wherein the matrix and vector additionally encode the preferences of the a task and the preferences of an organization.

9. A method for automatically determining awareness settings among people in a distributed working environment comprising the steps of:

receiving real-time data produced by an event; and automatically adjusting a distance according to a degree of clarity, desired by individual users, of a corresponding signal received from another party and a need of a collaborative project to have some shared information about individual user activities using an elastic spring energy model, wherein the elastic spring energy model takes into consideration a user's frustration level if information about the user is revealed to another on the occurrence of a particular event.

10. A method for automatically determining awareness settings among people in a distributed working environment comprising the steps of:

receiving real-time data produced by an event; and automatically adjusting a distance according to a degree of clarity, desired by individual users, of a corresponding signal received from another party and a need of a collaborative project to have some shared information about individual user activities using an elastic spring energy model, wherein the elastic spring energy model determines potential energy vectors which encode awareness requirements for a collaborative task.

11. A method for automatically determining awareness settings among people in a distributed working environment comprising the steps of:

receiving real-time data produced by an event; and automatically adjusting a distance according to a degree of clarity, desired by individual users, of a corresponding signal received from another party and a need of a collaborative project to have some shared information about individual user activities using an elastic spring energy model, wherein the elastic spring energy model determines potential energy vectors which encode a user's preference on distances and awareness requirements for a collaborative task.

* * * * *